US012544667B2

(12) United States Patent
Nishiyama et al.

(10) Patent No.: US 12,544,667 B2
(45) Date of Patent: Feb. 10, 2026

(54) SYSTEMS AND METHODS CONTROLLING NPC ACTIONS BASED ON AN EXPANDING IMITATION REGION

(71) Applicant: NINTENDO CO., LTD., Kyoto (JP)

(72) Inventors: Junhiro Nishiyama, Kyoto (JP); Koji Takahashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 717 days.

(21) Appl. No.: 17/885,995

(22) Filed: Aug. 11, 2022

(65) Prior Publication Data

US 2023/0090134 A1 Mar. 23, 2023

(30) Foreign Application Priority Data

Sep. 22, 2021 (JP) ................................ 2021-154577

(51) Int. Cl.

*A63F 13/56* (2014.01)
*A63F 13/44* (2014.01)
*A63F 13/5372* (2014.01)
*A63F 13/57* (2014.01)
*A63F 13/58* (2014.01)

(52) U.S. Cl.

CPC ............. *A63F 13/56* (2014.09); *A63F 13/44* (2014.09); *A63F 13/5372* (2014.09); *A63F 13/57* (2014.09); *A63F 13/58* (2014.09)

(58) Field of Classification Search

CPC ...... A63F 13/56; A63F 13/5372; A63F 13/44; A63F 13/58; A63F 13/57

See application file for complete search history.

(56) References Cited

U.S. PATENT DOCUMENTS

| | | | | |
|---|---|---|---|---|
| 6,409,604 | B1 * | 6/2002 | Matsuno | A63F 13/833 463/31 |
| 9,373,213 | B1 * | 6/2016 | Archer | A63F 13/42 |
| 10,118,099 | B2 * | 11/2018 | Condrey | A63F 13/60 |
| 10,940,393 | B2 * | 3/2021 | Somers | A63F 13/67 |
| 11,045,734 | B2 * | 6/2021 | Kando | A63F 13/847 |

(Continued)

FOREIGN PATENT DOCUMENTS

| | | |
|---|---|---|
| JP | 2006-268676 | 10/2006 |
| JP | 2011-120664 | 6/2011 |

(Continued)

OTHER PUBLICATIONS

Nintendo Co., Ltd., "CareFree Island Days, Make friends with the residents", [online], search Sep. 7, 2021, url:https://www.nintendo.co.jp/switch/acbaa/guide/index.html, 7 pages, partial translation.

(Continued)

*Primary Examiner* — William H McCulloch, Jr.
(74) *Attorney, Agent, or Firm* — Nixon & Vanderhye, PC

(57) ABSTRACT

A player character is caused to start a continuous action on the basis of an operation input. Every time a predetermined time elapses from the action start, a non-player character included in a predetermined range including a position of the player character and having a size corresponding to an elapsed time from the action start is determined. Then, the non-player character determined to be included in the predetermined range is caused to start the continuous action.

20 Claims, 19 Drawing Sheets

(56) References Cited

U.S. PATENT DOCUMENTS

| | | | | |
|---|---|---|---|---|
| 11,679,330 B2 * | 6/2023 | Eatedali | A63F 13/57 | 463/42 |
| 12,172,079 B2 * | 12/2024 | Carter, Jr. | A63F 13/812 | |
| 2007/0111789 A1 * | 5/2007 | van Deursen | A63F 13/54 | 463/40 |
| 2009/0104990 A1 * | 4/2009 | Tsujino | A63F 13/5255 | 463/32 |
| 2020/0197811 A1 * | 6/2020 | Eatedali | G06N 3/02 | |
| 2020/0338457 A1 * | 10/2020 | Tanabe | A63F 13/822 | |
| 2020/0368617 A1 * | 11/2020 | Kando | G06F 3/0346 | |
| 2021/0001229 A1 * | 1/2021 | Somers | A63F 13/67 | |
| 2022/0054936 A1 * | 2/2022 | Salik | A63F 13/52 | |
| 2023/0025389 A1 * | 1/2023 | Carter, Jr. | A63F 13/812 | |
| 2023/0090134 A1 * | 3/2023 | Nishiyama | A63F 13/57 | 463/31 |
| 2023/0338853 A1 * | 10/2023 | Eatedali | G06N 3/08 | |
| 2024/0367048 A1 * | 11/2024 | Endo | A63F 13/822 | |
| 2025/0235786 A1 * | 7/2025 | Carter, Jr. | A63F 13/812 | |

FOREIGN PATENT DOCUMENTS

| | | |
|---|---|---|
| JP | 2012-061091 | 3/2012 |
| JP | 2014-054304 | 3/2014 |
| JP | 2020-182532 | 11/2020 |

OTHER PUBLICATIONS

Feb. 7, 2023 Office Action issued in Japanese Patent Application No. 2021-154577 [machine translation included] pp. 1-3.

* cited by examiner

304

| ACTION ID (341) | ANIMATION DEFINITION DATA (342) | CORRESPONDING DIRECTION (343) |
|---|---|---|
| 1 | ··· | UP |
| 2 | ··· | DOWN |
| 3 | ··· | RIGHT |
| 4 | ··· | LEFT |

307

| STAGE NUMBER (371) | RANGE DEFINITION DATA (372) | VALID/INVALID FLAG (373) |
|---|---|---|
| 1 | RADIUS 0-2 m | VALID |
| 2 | RADIUS 2-4 m | INVALID |
| 3 | RADIUS 4-6 m | INVALID |

FIG. 16

306

| NPCID (361) | ACTION MODE (362) | NPC STATE (363) | DEFAULT ANIMATION DATA (364) | NPC EXECUTION ACTION ID (365) | START WAITING TIME (366) | END WAITING TIME (367) | NPC APPEARANCE DATA (368) |
|---|---|---|---|---|---|---|---|
| 001 | COPY MODE | DURING COPY ACTION | ··· | 001 | 1 | 1 | ··· |
| 002 | COPY MODE | WAITING FOR START | ··· | 001 | 2 | 2 | ··· |
| 003 | NORMAL MODE | null | ··· | null | ··· | ··· | ··· |

SYSTEMS AND METHODS CONTROLLING NPC ACTIONS BASED ON AN EXPANDING IMITATION REGION

CROSS REFERENCE TO RELATED APPLICATION

This application claims priority to Japanese Patent Application No. 2021-154577 filed on Sep. 22, 2021, the entire contents of which are incorporated herein by reference.

FIELD

The present disclosure relates to a process of controlling a non-player character in game processing.

BACKGROUND AND SUMMARY

Conventionally, a game in which a player virtually lives as a player character in a virtual game world in which various non-player characters (NPCs) live as residents, has been known. In such a game, the player can enjoy interacting with various NPCs.

In the above game, a NPC may react to the action performed by the player character. For example, when the player character performs an action of "yawn", a NPC near the player character may also perform a reaction of "yawn".

However, in the game described above, the case of causing a large number of NPCs to perform the same action as the player character is not particularly taken into consideration. For example, when a plurality of NPCs around the player character are caused to perform the same action as that performed by the player character, if all of the plurality of NPCs are caused to perform the action at the same time, the action may look unnatural.

Therefore, it is an object of the present disclosure to provide a computer-readable non-transitory storage medium having a game program stored therein, a game system, a game apparatus, and a game processing method which, when causing a plurality of NPCs to perform the same action as a player character, allow the NPCs to be controlled such that the action does not become unnatural.

In order to attain the object described above, for example, the following configuration examples are exemplified.

A configuration example is directed to a computer-readable non-transitory storage medium having a game program causing a computer of an information processing apparatus to execute the following process. Examples of the computer-readable non-transitory storage medium include magnetic media such as a flash memory, a ROM, and a RAM, and optical media such as a CD-ROM, a DVD-ROM, and a DVD-RAM. First, the game program causes the computer to: cause a player character to start a continuous action in a virtual space on the basis of an operation input; determine a non-player character included in a predetermined range including a position of the player character and having a size corresponding to an elapsed time from the action start, every time a predetermined time elapses from the action start; and cause the non-player character determined to be included in the predetermined range, to start the continuous action.

According to the above configuration example, the non-player character in the range having a size corresponding to the passage of time after the player character starts the continuous action is caused to start the continuous action. Accordingly, when a plurality of non-player characters are located in the range, the timings to cause the non-player characters to start the continuous action can be different from each other, so that it is possible to cause the non-player characters to perform a motion that gives no uncomfortable feeling.

In another configuration example, the game program may further cause the computer to: change a direction of the non-player character included in the predetermined range such that the non-player character faces toward the player character; and then cause the non-player character to start the continuous action.

According to the above configuration example, even if the non-player character does not face toward the player character at first, the non-player character faces toward the player character when starting the continuous action. Accordingly, it is possible to represent a motion that gives no uncomfortable feeling and in which the non-player character notices the motion of the player character and performs the same action.

In another configuration example, the game program may cause the computer to cause the non-player character included in the predetermined range to start the continuous action after, in addition to an elapsed time from the action start until the non-player character is included in the predetermined range, a waiting time set for each non-player character further elapses.

According to the above configuration example, after the non-player character becomes included in the predetermined range, when the waiting time set for each non-player character further elapses, the continuous action is started. Accordingly, the timings at which a plurality of non-player characters start the continuous action can be shifted from each other, so that it is possible to represent a motion that gives less uncomfortable feeling.

In another configuration example, the game program may cause the computer to cause the non-player character included in the predetermined range to start the continuous action after, in addition to the elapsed time, a waiting time randomly set for each non-player character further elapses.

In another configuration example, the game program may cause the computer to change the direction of the non-player character included in the predetermined range such that the non-player character faces toward the player character, at a timing at which, in addition to the elapsed time from the action start until the non-player character is included in the predetermined range, a waiting time set for each non-player character further elapses.

According to the above configuration example, a waiting time is set for each non-player character, and after the waiting time elapses, the direction of the non-player character is changed such that the non-player character faces toward the player character. Accordingly, the timing at which the non-player character faces toward the player character can be made different for each non-player character, so that it is possible to represent a motion that gives less uncomfortable feeling.

In another configuration example, the game program may cause the computer to cause the player character or the non-player character to perform the continuous action by causing the player character or the non-player character to repeat an animation to be reproduced in a predetermined unit period.

According to the above configuration example, the data size for the continuous action can be saved, and the storage capacity can be reduced.

In another configuration example, the game program may further cause the computer to: output BGM in which a plurality of action start timings are set in accordance with passage of a reproduction time; when causing the player character to start the continuous action on the basis of the operation input, cause the player character to start the continuous action when the action start timing arrives after the operation input; and cause the non-player character included in the predetermined range to start the continuous action when the action start timing arrives after a waiting time set for each non-player character further elapses from the elapsed time from the action start.

According to the above configuration example, both the player character and the non-player character start the continuous action in synchronization with the action start timing. Accordingly, the start motion of the continuous action can be made to coincide, so that the motions of the continuous actions performed by the player character and the non-player character can be synchronized with each other. In addition, it is possible to represent a state where all the characters are performing the continuous action according to the BGM. Accordingly, it is possible to provide a representation of motion having a sense of unity using a plurality of characters.

In another configuration example, the game program may cause the computer to cause the player character or the non-player character to perform the continuous action by causing the player character or the non-player character to repeat an animation to be reproduced in a predetermined unit period, and the plurality of action start timings may be set at an interval that is an integral multiple of the unit period.

According to the above configuration example, the action start timings are set at an interval that is an integral multiple of the unit period. Therefore, the starting part of the animation can be made to coincide, so that the motions of the continuous actions performed by the player character and the non-player character can be synchronized with each other.

In another configuration example, the game program may cause the computer to set the predetermined range such that the predetermined range expands stepwise with the position of the player character as a center in accordance with the elapsed time from the action start.

According to the above configuration example, the number of non-player characters that perform the same continuous action as the player character can be increased stepwise in accordance with the passage of time. Accordingly, it is possible to represent a motion in which the continuous action performed by the player character gradually propagates in accordance with the passage of time from the non-player character closer to the player character to the non-player character farther from the player character.

According to the present disclosure, when causing a plurality of non-player characters to perform the same motion as the player character, it is possible to represent a motion, of each non-player character, which gives no uncomfortable feeling.

BRIEF DESCRIPTION OF THE DRAWINGS

FIG. 16 illustrates a non-limiting example of the data structure of NPC data 306;

DETAILED DESCRIPTION OF NON-LIMITING EXAMPLE EMBODIMENTS

Hereinafter, an exemplary embodiment will be described. It is to be understood that, as used herein, elements and the like written in singular form with a word "a" or "an" attached before them do not exclude those in the plural form.

[Hardware Configuration of Information Processing Apparatus]

First, an information processing apparatus for executing information processing according to the exemplary embodiment will be described. The information processing apparatus is, for example, a smartphone, a stationary or hand-held game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, referred to simply as a game apparatus) will be described as an example of the information processing apparatus.

Figure 1:
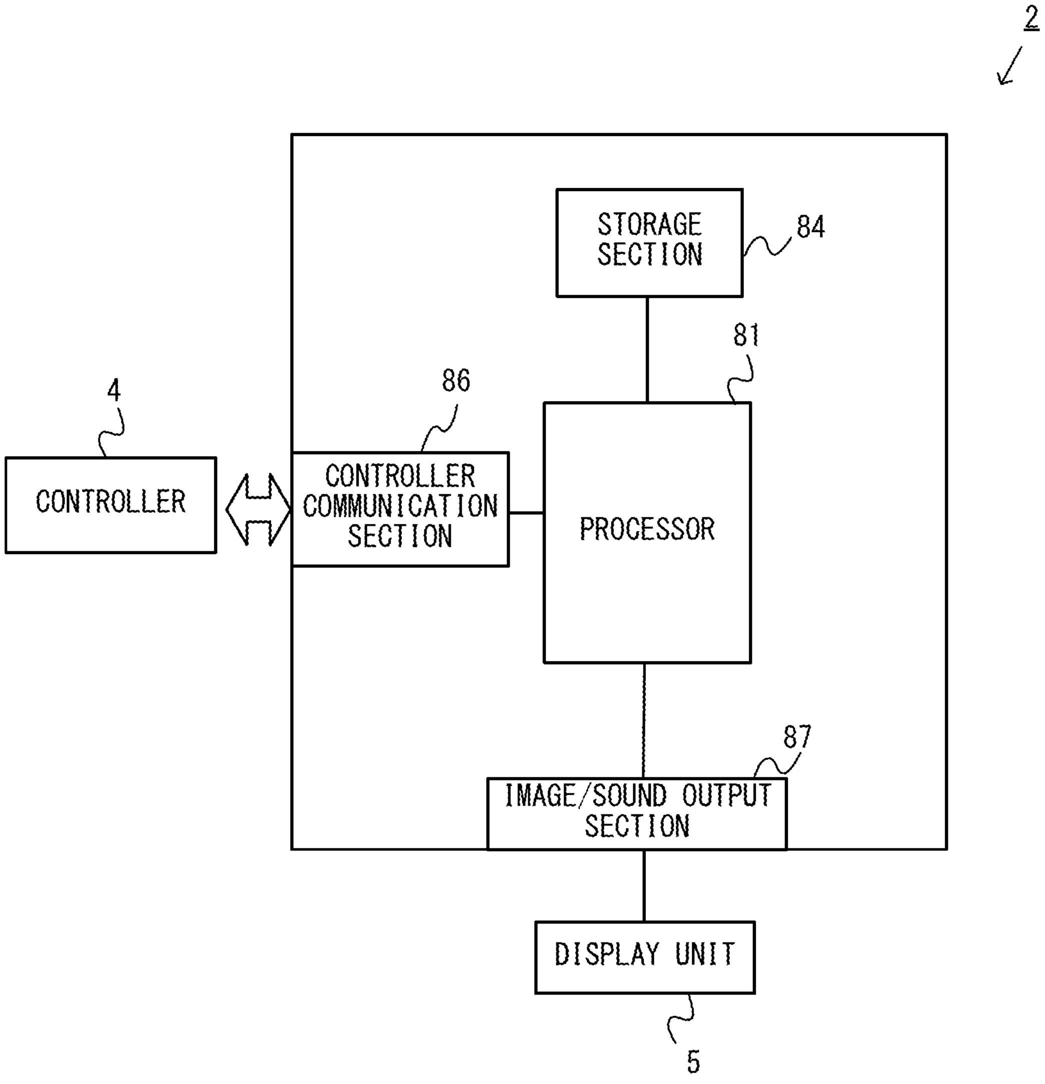
FIG. 1 is a block diagram showing a non-limiting example of the internal configuration of a game apparatus 2.

FIG. 1 is a block diagram showing an example of the internal configuration of a game apparatus 2 according to the exemplary embodiment. The game apparatus 2 includes a processor 81. The processor 81 is an information processing section for executing various types of information processing to be executed by the game apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs the various types of information processing by executing an information processing program (e.g., a game program) stored in a storage section 84. The storage section 84 may be, for example, an internal storage medium such as a flash memory and a dynamic random access memory (DRAM), or may be configured to utilize an external storage medium mounted to a slot that is not shown, or the like.

The game apparatus 2 also includes a controller communication section 86 for the game apparatus 2 to perform wired or wireless communication with a controller 4. Although not shown, the controller 4 is provided with various buttons such as a cross key and A, B, X, and Y buttons, an analog stick, etc.

Moreover, a display unit 5 (for example, a television, or the like) is connected to the game apparatus 2 via an image/sound output section 87. The processor 81 outputs an image and sound generated (for example, by executing the above information processing) to the display unit 5 via the image/sound output section 87.

[Outline of Game Processing in Exemplary Embodiment]

Next, an outline of operation of game processing (an example of the information processing) executed by the game apparatus 2 according to the exemplary embodiment will be described. First, a game assumed in the exemplary embodiment is a game in which a player character (hereinafter, referred to as a PC) which is a virtual object to be operated by a user is caused to perform a predetermined action. Specifically, the game assumed in the exemplary embodiment is a game in which a PC is caused to perform a motion like a dance.

In the exemplary embodiment, at least a part of a three-dimensional virtual game space (hereinafter, referred to simply as a virtual space) is set as a "dance area". The user can move the PC to this dance area by operating the PC. The processing according to the exemplary embodiment is processing in the dance area. The entire range in which the PC can move may be set as a dance area.

Figure 2:
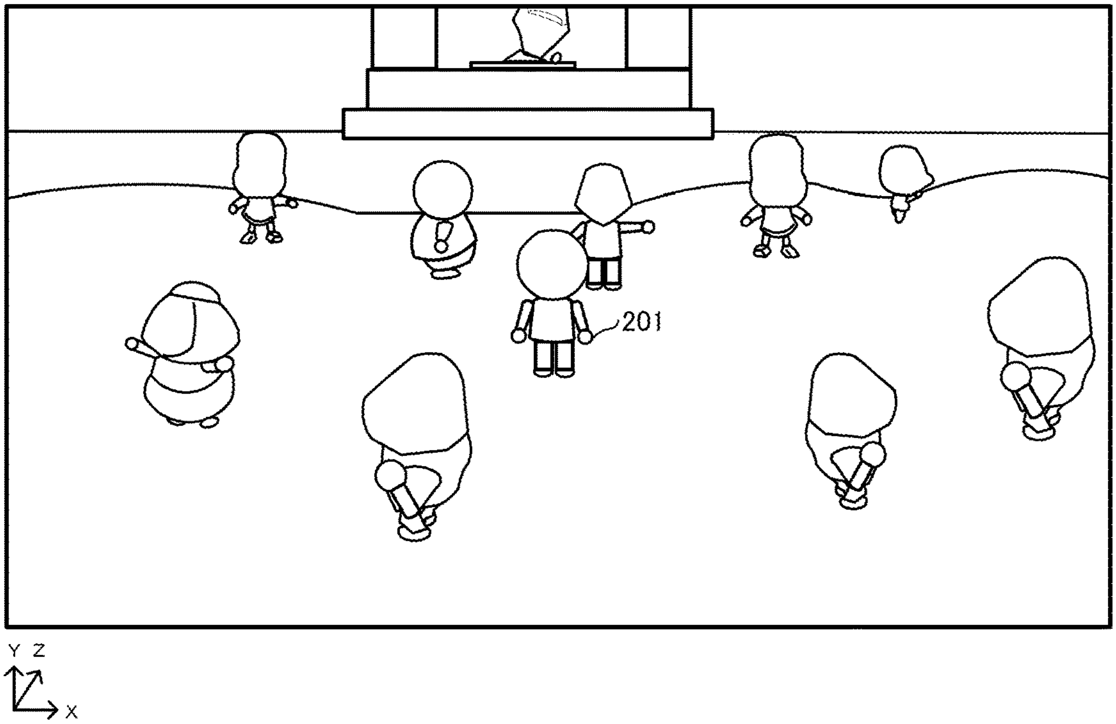
FIG. 2 illustrates a non-limiting example of a game screen according to an exemplary embodiment.
Figure 3:
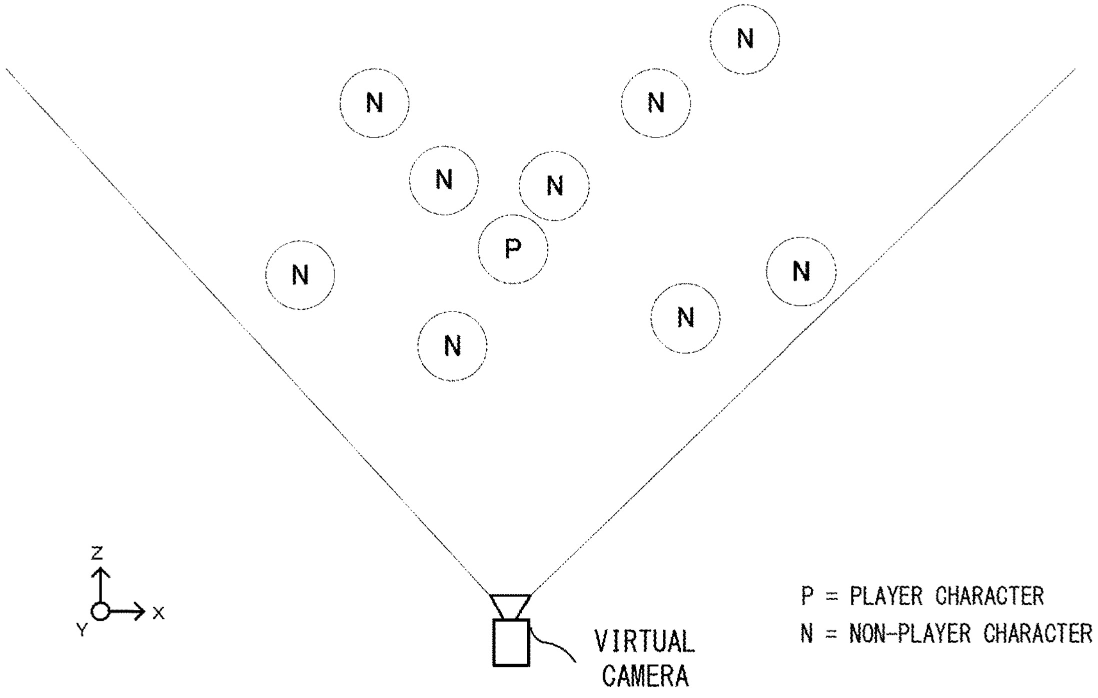
FIG. 3 is a schematic diagram showing a non-limiting example of the positional relationship between a PC 201 and NPCs.

FIG. 2 illustrates an example of a game screen assumed in the exemplary embodiment. This screen is a three-dimensional game image obtained by capturing at least a part of the dance area with a virtual camera. In addition, FIG. 3 is a schematic diagram showing an overhead view of at least a part of the dance area in the state of FIG. 2 in order to make it easier to understand the positional relationship between a PC 201 and NPCs. In FIG. 2, the PC 201 exists substantially at the center of the game screen. Regarding the control of the virtual camera, the virtual camera is controlled so as to follow the position of the PC 201 such that the PC 201 appears substantially at the center of the field of view of the virtual camera. In this screen, the PC 201 is in a standing position. Moreover, a plurality of NPCs (non-player characters) exist around the PC 201. Specifically, in the example of FIG. 2, nine NPCs exist. Each of these NPCs individually repeats a predetermined animation for a few seconds per loop, representing a state where the NPCs are individually dancing. In addition, a DJ booth also exists on the far side of the screen when viewed from the virtual camera. Moreover, predetermined BGM associated with the dance area is also reproduced in the dance area (a DJ character in the DJ booth is playing the BGM). That is, the situation is a situation in which the PC 201 has entered the dance area in which the NPCs are individually dancing.

<Operation of PC>

Next, operation of the PC 201 in the dance area will be described. First, the user can move the PC 201 in the dance area by operating the analog stick of the controller 4. In addition, the PC 201 can also move (exit) to the outside of the dance area. Moreover, the user can cause the PC 201 to perform a predetermined "continuous action" by pressing the cross key of the controller 4. The continuous action is an action in which a predetermined animation (character motion) for which a predetermined unit period is set as a reproduction time is repeatedly performed. In the exemplary embodiment, a description will be given with an example in which the unit period is 4 seconds. That is, it is assumed that an animation in which a motion for one loop is a motion for 4 seconds is defined as the predetermined animation. Furthermore, in the exemplary embodiment, different predetermined animations are associated with upward, downward, leftward, and rightward direction portions of the cross key, respectively. That is, the user can cause the PC 201 to perform four kinds of animations by pressing the respective direction portions of the cross key.

In the state of FIG. 2, for example, when the user presses the upward direction portion of the cross key, the PC 201 starts the predetermined animation associated with the upward direction portion, at the current position. The user does not have to keep pressing the cross key in order to cause the PC 201 to perform the animation, and even when the user presses the upward direction portion with their finger once and releases the finger therefrom, the PC 201 repeats the animation until an action stop operation is performed. Similarly, when the user performs an input on another direction portion, the PC 201 starts the animation associated with this other direction portion, and repeats this animation until the action stop operation is performed. Here, in the exemplary embodiment, an operation input other than the cross key is treated as the action stop operation. For example, when the user performs an input on the analog stick (makes a movement instruction) while the PC 201 is performing the continuous action, the PC 201 stops the continuous action. Thereafter, the PC 201 moves according to the input direction.

<Control of NPCs>

Next, action control of the NPCs in the exemplary embodiment will be described. In the exemplary embodiment, in a default state, each NPC repeats a specific animation that is set individually for each NPC, by AI control that is set for each NPC. Then, in the exemplary embodiment, when the PC 201 starts the continuous action as described above, control in which each NPC imitates the continuous action performed by the PC is controlled. That is, when the PC 201 starts the continuous action, each NPC imitates the continuous action, and as a result, all the characters in the dance area are performing the same animation at the same timing. This is continued until the user performs the action stop operation. When the action stop operation is performed, each NPC stops imitating the motion of the PC 201 and returns to the repeated motion of the individual animation by the above AI control. In the exemplary embodiment, it is assumed that each NPC does not move from its own placed position in the dance area and continues to dance at this spot. Also, in the following description, the action in which the NPC imitates the continuous action of the PC 201 is referred to as "copy action".

As described above, in the exemplary embodiment, control in which each NPC imitates the continuous action of the PC 201 as a copy action is performed. Here, regarding the timing to start the above copy action, if all the plurality of NPCs start the same animation at the same time as the PC 201 starts the continuous action, the animation may look unnatural, making the user feel uncomfortable. Therefore, in the exemplary embodiment, regarding the timing at which the plurality of NPCs start the copy action, the following control is performed.

Figure 4:
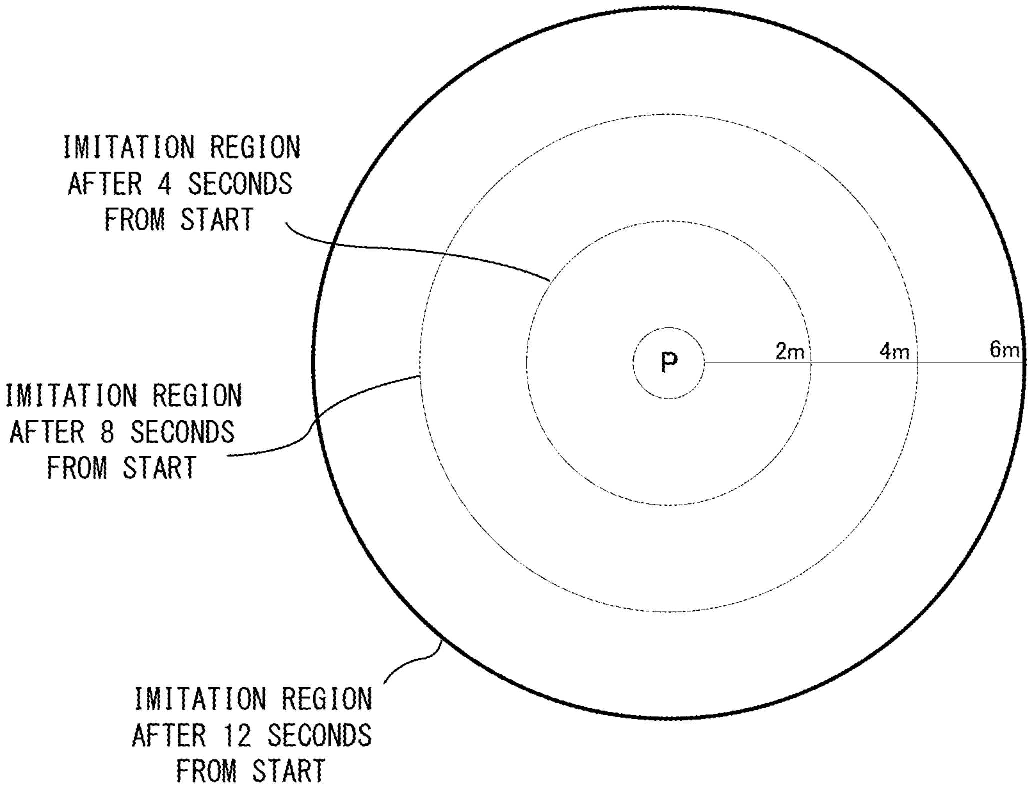
FIG. 4 illustrates a non-limiting example of an imitation region.

In the exemplary embodiment, when the PC 201 starts the continuous action, control in which the range of a collision determination region (hereinafter, referred to as an imitation region) for causing the NPCs to start the copy action is expanded with the position of the PC 201 as a center in accordance with the passage of time, is performed. FIG. 4 shows an example of the concept of the imitation region. In the exemplary embodiment, the imitation region is set so as to spread concentrically with the position of the PC 201 as a center. First, at the timing at which the PC 201 starts the continuous action (hereinafter, referred to as start timing), the imitation region is not yet set. After 4 seconds elapse from the start timing, a region from the position of the PC 201 to a radius of 2 m in the virtual space is set as the imitation region. Thereafter, every 4 seconds, the range of the imitation region is expanded by a radius of 2 m. That is, the imitation region is expanded stepwise every 4 seconds. FIG. 4 shows an example in which the imitation region expands in three stages. The number of stages at which the imitation region expands is arbitrary, but, for example, the range of the imitation region may be expanded to the extent that the entire dance area can be covered. Regarding the determination of the number of stages, for example, the number of stages at which the range of the imitation region is expanded may be calculated by obtaining the direct distance from the position of the PC 201 to the outermost edge of the dance area and dividing the direct distance by 2 m.

In the exemplary embodiment, a description will be given with an example in which the imitation region is expanded every 4 seconds, but the time interval for expanding the imitation region does not have to be a fixed interval. In another exemplary embodiment, for example, the timing of expanding the imitation region may be determined in advance such that the imitation region is expanded at non-constant time intervals such as 4 seconds, 10 seconds, 18 seconds, . . . . In addition, the shape (concentric circle) and the expansion unit (2 m) of the imitation region are examples, and a different shape or unit may be used in another exemplary embodiment. For example, a quadrilateral or pentagonal shape may be used, or the imitation region may be expanded in units of 1 m or 3 m instead of a radius of 2 m (in the virtual space). Moreover, for example, the expansion unit may be dynamically changed such that the imitation region is first expanded by a radius of 1 m and then the expansion unit is gradually increased to 2 m and 3 m or decreased.

Figure 5:
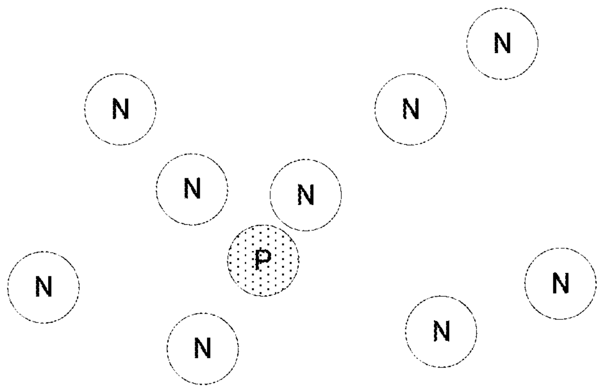
FIG. 5 is a schematic diagram showing a non-limiting example of the positional relationship between the PC 201 and the NPCs.
Figure 6:
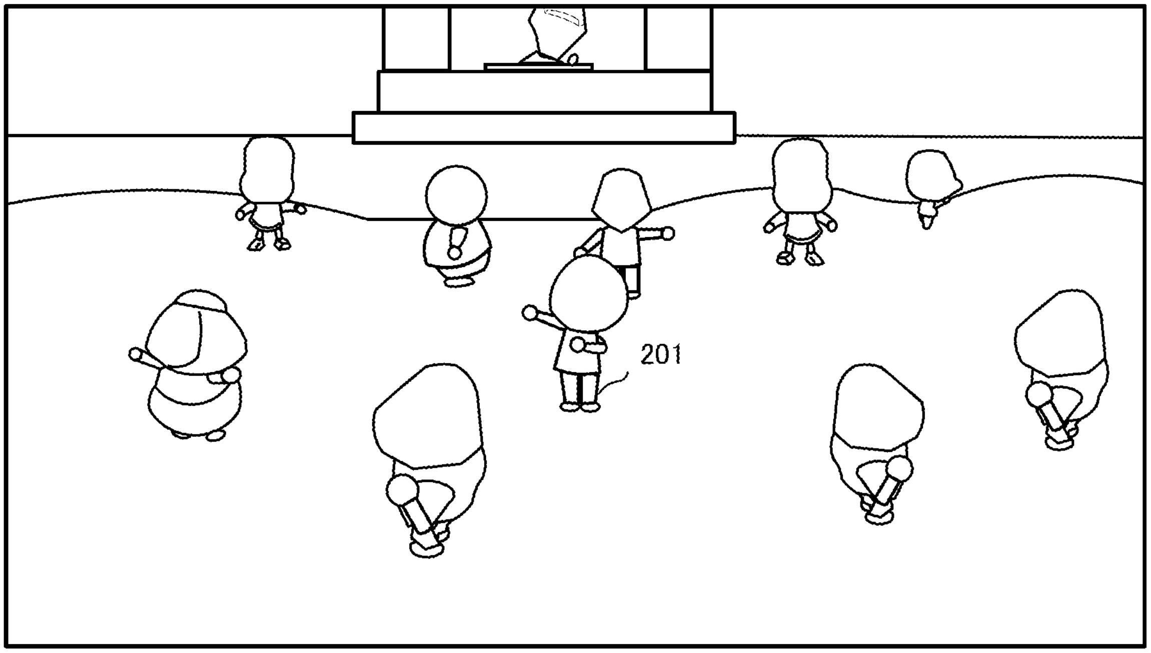
FIG. 6 illustrates a non-limiting example of the game screen according to the exemplary embodiment.

As described above, the imitation region is expanded with a time lag from the start timing of the continuous action of the PC 201. Then, when a NPC becomes located in this region, control of causing this NPC to start imitating the continuous action performed by the PC 201, that is, start the copy action, is performed. FIG. 5 to FIG. 12 illustrate the positional relationship between the PC 201 and the NPCs and game screen examples in the case of expanding the imitation region in the three stages. FIG. 5 illustrates an overhead view of the dance area immediately after the PC 201 starts the continuous action. FIG. 6 illustrates a game screen example in this case. In FIG. 6, the imitation region has not been set yet, and only the PC 201 is performing the continuous action (in this example, it is assumed that an animation in which both arms are moved like pulling a bow is repeated).

Figure 7:
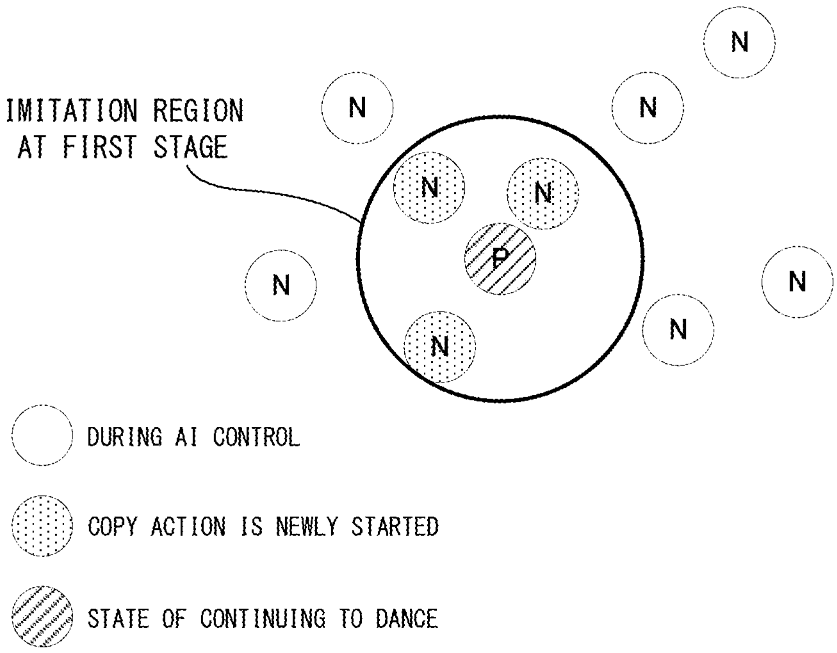
FIG. 7 is a schematic diagram showing a non-limiting example of the positional relationship between the PC 201, the NPCs, and the imitation region.
Figure 8:
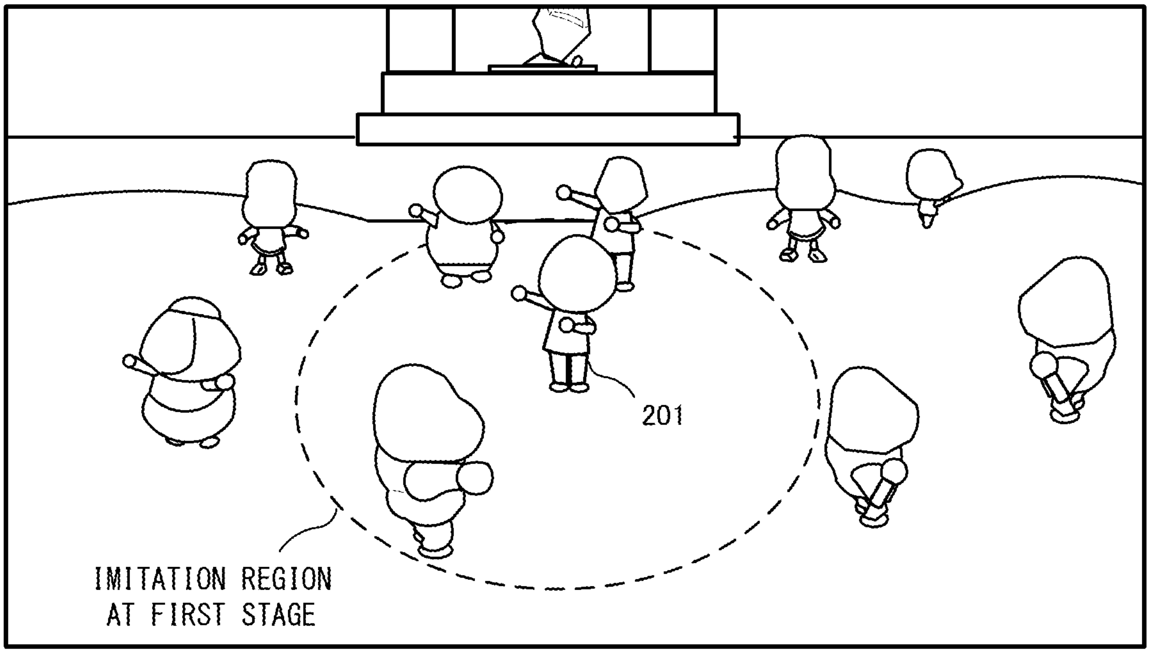
FIG. 8 illustrates a non-limiting example of the game screen according to the exemplary embodiment.

FIG. 7 and FIG. 8 illustrate an overhead view of the dance area and an example of a game screen after 4 seconds from the start timing, respectively. In FIG. 7, an imitation region at the first stage is set. The game screen of FIG. 8 shows that three NPCs in the imitation region at the first stage have newly started the copy action. In FIG. 8, the imitation region is shown by a broken line, but is not actually displayed on the screen (the same applies hereinafter).

Here, in the exemplary embodiment, when a NPC starts the copy action, if the NPC does not face toward the PC 201, control in which the NPC faces the PC 201 and starts the copy action, is also performed. That is, an action in which the NPC notices the motion of the PC 201 and starts imitating the motion of the PC 201, is represented. The example of FIG. 8 shows that the two NPCs on the left side of the PC 201 (when viewed from the virtual camera) have faced toward the PC 201 and started the copy action.

Figure 9:
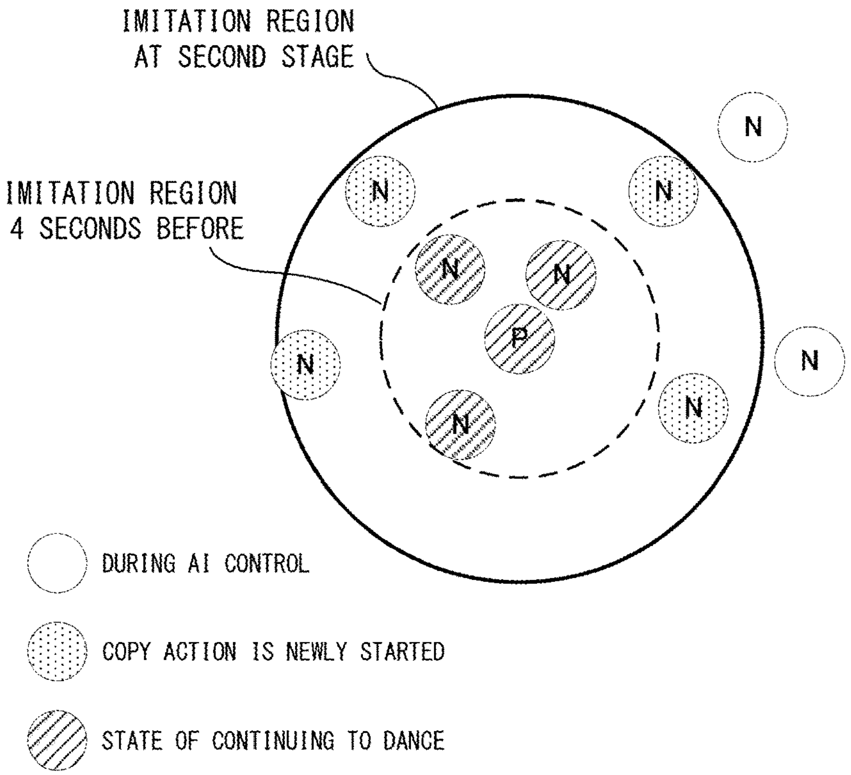
FIG. 9 is a schematic diagram showing a non-limiting example of the positional relationship between the PC 201, the NPCs, and the imitation region.
Figure 10:
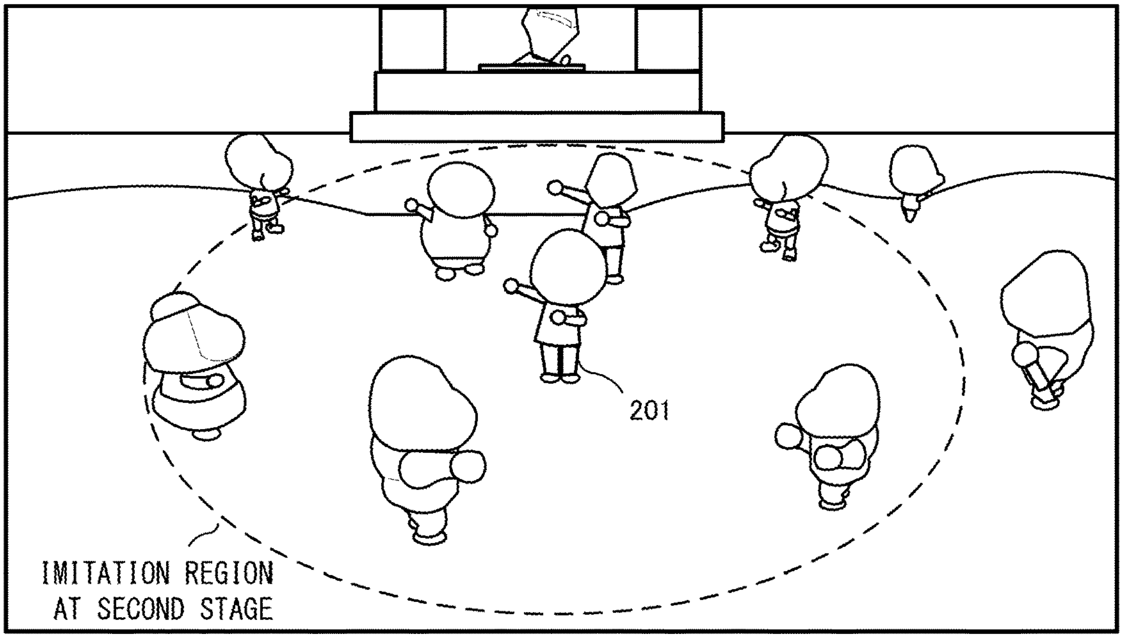
FIG. 10 illustrates a non-limiting example of the game screen according to the exemplary embodiment.

FIG. 9 and FIG. 10 illustrate an overhead view of the dance area and an example of a game screen after 8 seconds from the start timing, respectively. In FIG. 9, the imitation region has been expanded to the second stage. The game screen of the FIG. 10 shows that the four NPCs that have just belonged to the imitation region at the second stage have newly started the copy action. The direction control at this time is the same as described above. In addition, the two NPCs that are located outside the imitation region at this time are still performing the action by AI control.

Figure 11:
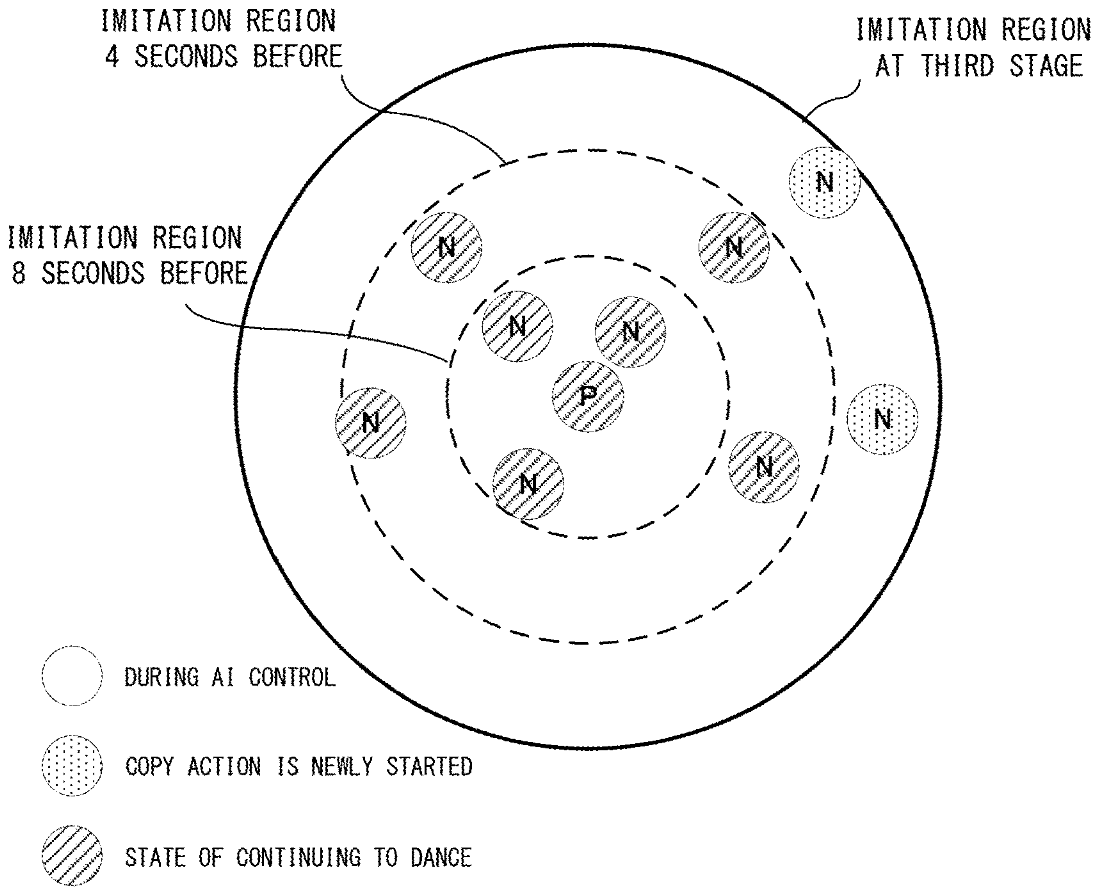
FIG. 11 is a schematic diagram showing a non-limiting example of the positional relationship between the PC 201, the NPCs, and the imitation region.
Figure 12:
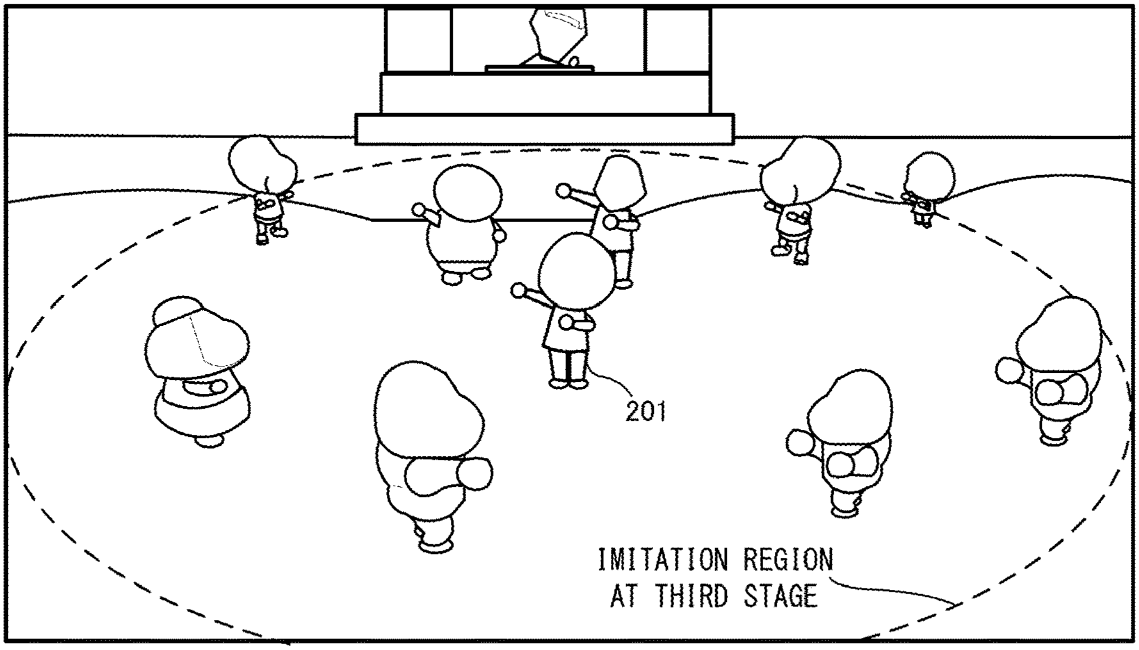
FIG. 12 illustrates a non-limiting example of the game screen according to the exemplary embodiment.

FIG. 11 and FIG. 12 illustrate an overhead view of the dance area and an example of a game screen after 12 seconds from the start timing, respectively. FIG. 11 shows that the imitation region has been expanded to the third stage. The game screen of FIG. 12 shows that the two NPCs that have just belonged to the imitation region at the third stage have newly started the copy action. The direction control at this time is the same as described above. As a result, in the game screen of FIG. 12, all the NPCs in the dance area are imitating the continuous action while facing toward the PC 201.

As described above, in the exemplary embodiment, control in which the NPC starts the copy action when the NPC comes to a state of existing in the imitation region from a state of not existing in the imitation region, is performed. At this time, in the exemplary embodiment, control in which, even when the NPC comes to a state of existing in the imitation region, the copy action is not started immediately, a waiting time randomly determined between 0 and 3 seconds for each NPC is provided, and then the copy action is started, is also performed. For example, the imitation region at the first stage is set when 4 seconds elapses from the start timing, and all the three NPCs existing in this region at this time do not start the copy action at the same time but control in which the copy action start timings thereof are shifted from each other in the range of 0 to 3 seconds is performed. That is, control in which a slight time lag is provided between the times at which the NPCs in the same imitation region notice the motion of the PC 201, is performed. Accordingly, it is possible to prevent a plurality of NPCs from noticing the motion of the PC 201 and facing toward the PC 201 at the same time to give an unnatural impression to the user.

In addition to the above, in the exemplary embodiment, control of synchronizing the start timing of the continuous action with the timing to reproduce the BGM is also performed. Specifically, in the exemplary embodiment, the "action start timing" is set at intervals each of which is an integral multiple of 4 seconds which is the above unit period, in the BGM reproduction period. In the exemplary embodiment, a description will be given with an example in which the "action start timing" is set at 4-second intervals (that is, 1 time). Control in which the continuous action is started in accordance with the arrival of the action start timing is performed. As an example of control of the PC 201, for example, it is assumed that the user presses the upward direction portion of the cross key at the time point 2 seconds before the action start timing. In this case, control in which the PC 201 waits for 2 seconds and then starts the continuous action corresponding to the upward direction, is performed. Regarding NPC control, control in which, if the time point at which the waiting time of 0 to 3 seconds elapses after the NPC comes to a state of existing in the imitation region is 2 seconds before the action start timing, then the NPC further waits for 2 seconds and starts the copy action, is performed. For example, the case where the waiting time is set to 1 second for a predetermined NPC in the imitation region at the first stage is assumed. In this case, before the NPC starts the copy action, the NPC waits for a total of 7 seconds, 4 seconds+a waiting time of 1 second+a waiting time of 2 seconds until the action start timing in the BGM arrives, from the start timing of the continuous action of the PC 201. By causing the PC 201 and the NPCs to start the continuous action (copy action) in accordance with the BGM reproduction timing as described above, the start of the animation of the continuous action can be made to coincide, and finally the motions of the PC 201 and the NPCs can be synchronized with each other.

It is sufficient that each interval for setting the action start timing is an integral multiple of the unit period, and the action start timing does not necessarily have to be set at equal intervals Also, in the exemplary embodiment, when the action stop operation is performed, the NPCs are not caused to perform the copy action all at once at that timing, and regarding the timing to stop the copy action, control of expanding in accordance with the passage of time similar to the above is also performed. Specifically, when the action stop operation is performed, control in which the setting of the concentric imitation region is canceled stepwise every 4 seconds is performed. For example, after 4 seconds from the time at which the action stop operation is performed, the setting of the imitation region at the first stage (region up to a radius of 2 m) is canceled (as a result, the shape of the imitation region is temporarily a donut shape having a hole at the center thereof). Then, the NPC that has been in the imitation region at the first stage stops the copy action after the same random waiting time of 0 to 3 seconds as described above, and returns to the control in the default state. Furthermore, after 8 seconds from the time at which the action stop operation is performed, the imitation region at the second stage is canceled, and after 12 seconds, the imitation region at the third stage is canceled. Accordingly, similar to the above, the NPCs that have been in these regions also stop the copy action and return to the control in the default state. As described above, in the exemplary embodiment, when the PC 201 stops the continuous action, the NPCs are caused to stop the copy action, and, at this time, control in which the NPCs are caused to stop the copy action in stages is performed.

Details of Game Processing of Exemplary Embodiment

Next, the game processing in the exemplary embodiment will be described with reference to FIG. 13 to FIG. 26.

[Data to be Used]

Figure 13:
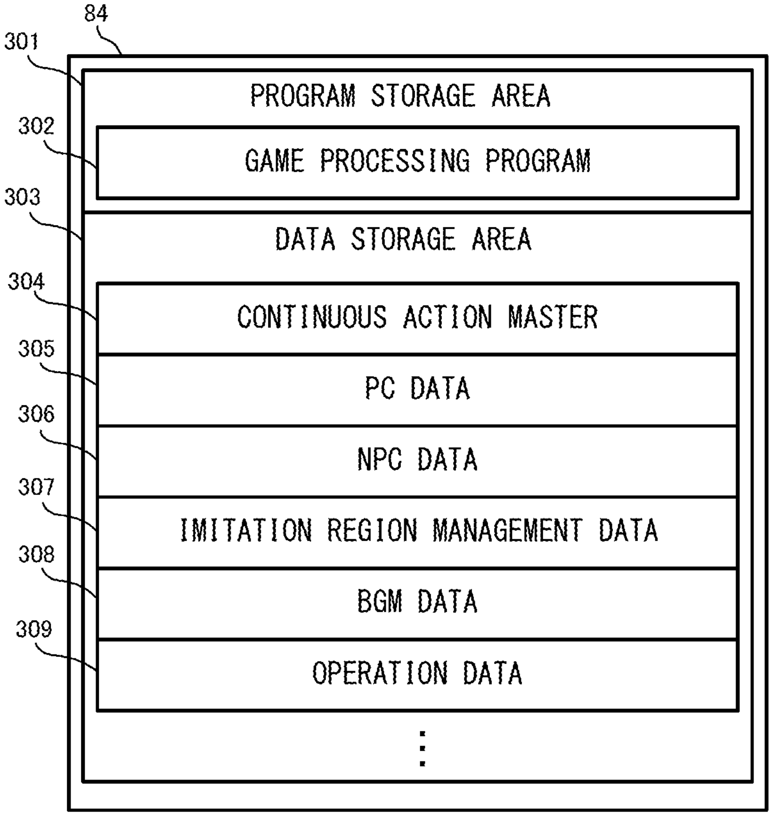
FIG. 13 illustrates a memory map showing a non-limiting example of various kinds of data stored in a storage section 84.

First, various kinds of data to be used in the game processing will be described. FIG. 13 illustrates a memory map showing an example of various kinds of data stored in the storage section 84 of the game apparatus 2. The storage section 84 includes a program storage area 301 and a data storage area 303. A game processing program 302 is stored in the program storage area 301. In addition, a continuous action master 304, PC data 305, NPC data 306, imitation region management data 307, BGM data 308, operation data 309, etc., are stored in the data storage area 303.

The game processing program 302 is a program for executing the game processing according to the exemplary embodiment, and also includes a program code for executing various kinds of control in the dance area as described above.

Figures 14, 15, 17:
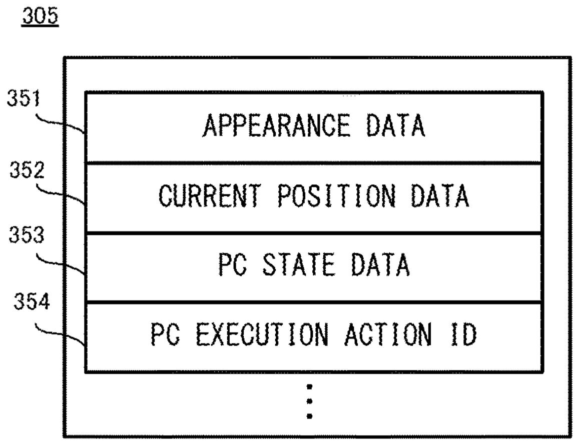
FIG. 14 illustrates a non-limiting example of the data structure of a continuous action master 304.
FIG. 15 illustrates a non-limiting example of the data structure of PC data 305.
FIG. 17 illustrates a non-limiting example of the data structure of imitation region management data 307.

The continuous action master 304 is data that defines the correspondence between a continuous action and an input direction of the cross key. FIG. 14 illustrates an example of the data structure of the continuous action master 304. The continuous action master 304 is data in a table format having items such as an action ID 341, animation definition data 342, and a corresponding direction 343. The action ID 341 is an ID for uniquely identifying the above four kinds of continuous actions. The animation definition data 342 is data that defines the animation content of each continuous action. The corresponding direction 343 is defined as an input direction of the cross key associated with each continuous action.

Referring back to FIG. 13, the PC data 305 is data regarding the PC 201. FIG. 15 illustrates an example of the data structure of the PC data 305. The PC data 305 includes at least appearance data 351, current position data 352, PC state data 353, and a PC execution action ID 354. The appearance data 351 is data that defines the appearance of the PC 201. Specifically, the appearance data 351 is 3D model data or texture data. The current position data 352 is data indicating the current position of the PC 201 in the virtual space. The PC state data 353 is data for indicating whether the PC 201 is in a state of executing the continuous action. In the exemplary embodiment, it is assumed that the state of the PC 201 in the dance area transitions between three kinds of states, "non-action state", "waiting for start", and "during action". The "waiting for start" is a state until the PC 201 actually starts the continuous action after an input to the cross key is made. That is, the "waiting for start" is a state until the above-described action start timing in the BGM arrives after an input to the cross key is made. The "during action" is a state where the PC 201 is actually performing the continuous action. The "non-action state" is a default state and is a state other than the above two states (for example, during movement, etc.). The PC execution action ID 354 is data for identifying the continuous action currently executed by the PC 201, and any value of the action ID 341 of the continuous action master 304 can be set.

Referring back to FIG. 13, the NPC data 306 is data for managing the NPCs. FIG. 16 illustrates an example of the data structure of the NPC data 306. The NPC data 306 is a database having at least items such as an NPC ID 361, an action mode 362, a NPC state 363, default animation data 364, a NPC execution action ID 365, a start waiting time 366, an end waiting time 367, and NPC appearance data 368.

The NPC ID 361 is an ID for uniquely identifying each NPC. The action mode 362 is data indicating the action mode of the NPC. Here, in the exemplary embodiment, there are "normal mode" and "copy mode" as the action mode of the NPC. The copy mode is an action mode when the NPC performs the above copy action. The normal mode is an action mode when the action mode of the NPC is not the copy mode, and is an action mode when the NPC makes a motion by AI control.

The NPC state 363 is data indicating the state of the NPC when the action mode of the NPC is the copy mode. In the exemplary embodiment, it is assumed that, as the NPC state, there are three states, "waiting for start", "during copy action", and "waiting for cancellation". The "waiting for start" is a state until the NPC actually starts the copy action after the NPC becomes located in the imitation region. The "during copy action" is a state when the NPC is located in the imitation region and is performing the copy action. The "waiting for cancellation" is a state from the time at which the NPC performing the copy action becomes located outside the imitation region (as a result of cancellation of the setting of the imitation region) to the time at which the NPC actually stops the copy action.

The default animation data 364 is data that defines an animation to be performed by the NPC when the mode of the NPC is the normal mode. In the exemplary embodiment, as this animation, a different animation is defined for each NPC.

The NPC execution action ID 365 is data for identifying a copy action to be performed (continuous action to be imitated) by the NPC, and any value of the action ID 341 of the continuous action master 304 can be set.

The start waiting time 366 is data indicating a waiting time randomly determined between 0 and 3 seconds as described above when starting the copy action. In addition, the end waiting time 367 is data indicating a waiting time similarly randomly determined when stopping the copy action.

The NPC appearance data 368 is data that defines the appearance of each NPC.

Referring back to FIG. 13, the imitation region management data 307 is data used to manage the expansion or cancellation of the imitation region as described above. In addition, the imitation region management data 307 is temporarily generated data, is generated when starting the continuous action, and is deleted when cancelling the entire imitation region. FIG. 17 illustrates an example of the data structure of the imitation region management data 307. The imitation region management data 307 is a database having items such as a stage number 371, range definition data 372, and a valid/invalid flag 373. The stage number 371 is data indicating the stage at which the imitation region is expanded. The total number of stages can be changed according to the position of the PC 201 at the time at which an instruction to start the continuous action is made and the distance to the edge of the dance area. In the following, a description will be given with the case where the entirety of the dance area can be covered when the imitation region is expanded to the third stage, as an example. The range definition data 372 is data that defines the range of the imitation region corresponding to each stage. In the exemplary embodiment, an example in which the range is defined by specifying a radius (centered on the position of the PC 201) is shown as an example. In addition, the valid/invalid flag 373 is a flag indicating whether the range of the imitation region corresponding to each stage is valid or invalid. If the valid/invalid flag 373 is valid, the valid/invalid flag 373 indicates that the range of the imitation region is set. In addition, "invalid" is set as the initial state. In the exemplary embodiment, since it is assumed that the imitation region is expanded in units of 2 m, when the first stage becomes "valid", a region having a radius of 0 to 2 m is set as the imitation region (the state as in FIG. 7). Similarly, when the second stage is made "valid", a region having a radius of 2 to 4 m is additionally set as the imitation region (see FIG. 9), and as a result, a range having a radius of 0 to 4 m is a valid imitation region. Moreover, when the third stage is made "valid", a region having a radius of 4 to 6 m is additionally set as the imitation region (see FIG. 11). As a result, a range having a radius of 0 to 6 m is a valid imitation region. By making each region to be valid stepwise as described above, control of stepwise expanding the imitation region in accordance with the passage of time is performed. In addition, in the case where the imitation region is cancelled stepwise, stepwise cancellation control is performed by performing control such that the valid/invalid flag 373 is set to "invalid" in order from the first stage in accordance with the passage of time.

Referring back to FIG. 13, the BGM data 308 is data of the BGM to be played in the dance area. The BGM data 308 also includes data indicating the "action start timing" as described above (in this example, the action start timing is set every 4 seconds in the reproduction period).

The operation data 309 is data indicating the content of an operation performed on the controller 4. In the exemplary embodiment, the operation data 309 includes data indicating pressed states of the buttons such as the cross key or an input state to the analog stick provided to the controller 4. The content of the operation data 309 is updated in predetermined cycles on the basis of a signal from the controller 4.

In addition, various kinds of data to be used in the game processing are stored as necessary in the storage section 84.

[Details of Processing Executed by Processor 81]

Figure 18:
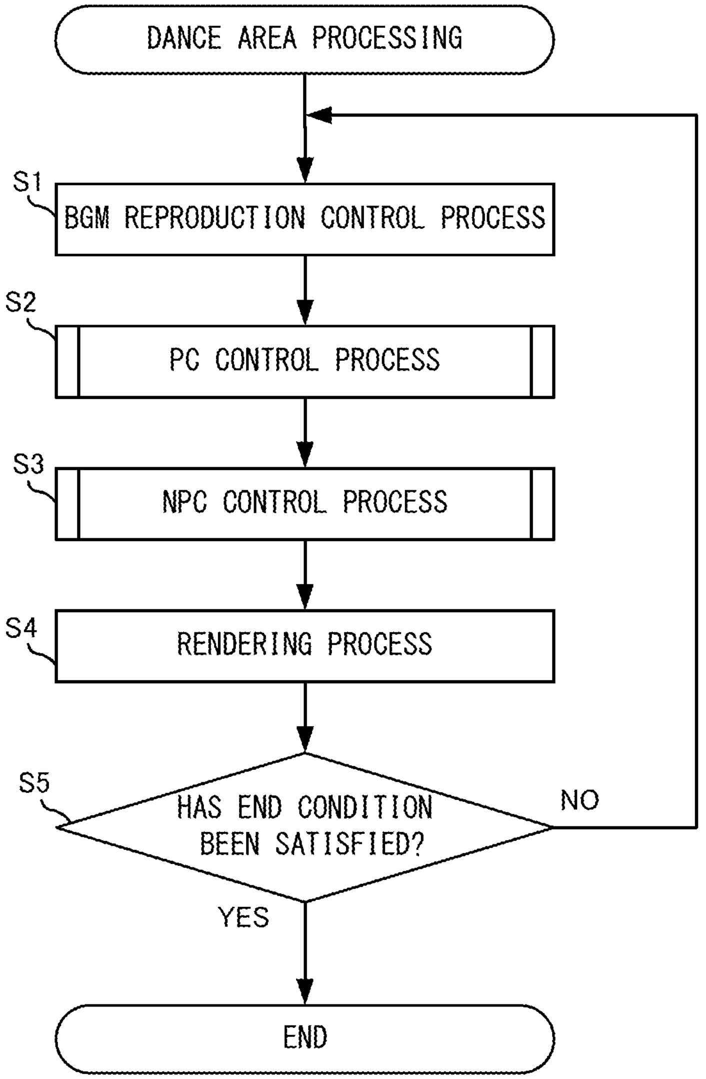
FIG. 18 is a non-limiting example flowchart showing the details of dance area processing according to the exemplary embodiment.

Next, the game processing according to the exemplary embodiment, particularly, processing in the dance area (hereinafter, referred to as dance area processing), will be described in detail. FIG. 18 is a flowchart showing the details of the dance area processing. This processing is executed, for example, when the PC 201 enters the dance area in the virtual space. Prior to the execution of this processing, for example, the following processing is performed when the PC 201 approaches the dance area to a predetermined distance. That is, the processing of placing NPCs at predetermined positions in the dance area, setting the action mode 362 of each NPC to the normal mode, and starting action control of each NPC by AI is performed before the PC 201 enters the dance area. Moreover, a process loop of steps S1 to S5 shown in FIG. 18 is repeatedly executed every frame period.

The flowchart is merely an example of the processing. Therefore, the order of each process step may be changed as long as the same result is obtained. In addition, the values of variables and thresholds used in determination steps are also merely examples, and other values may be used as necessary.

In FIG. 18, first, in step S1, the processor 81 executes a BGM reproduction control process. Specifically, the processor 81 executes a process for advancing a reproduction portion of the BGM, on the basis of the BGM data 308.

[Control of PC 201]

Figure 19:
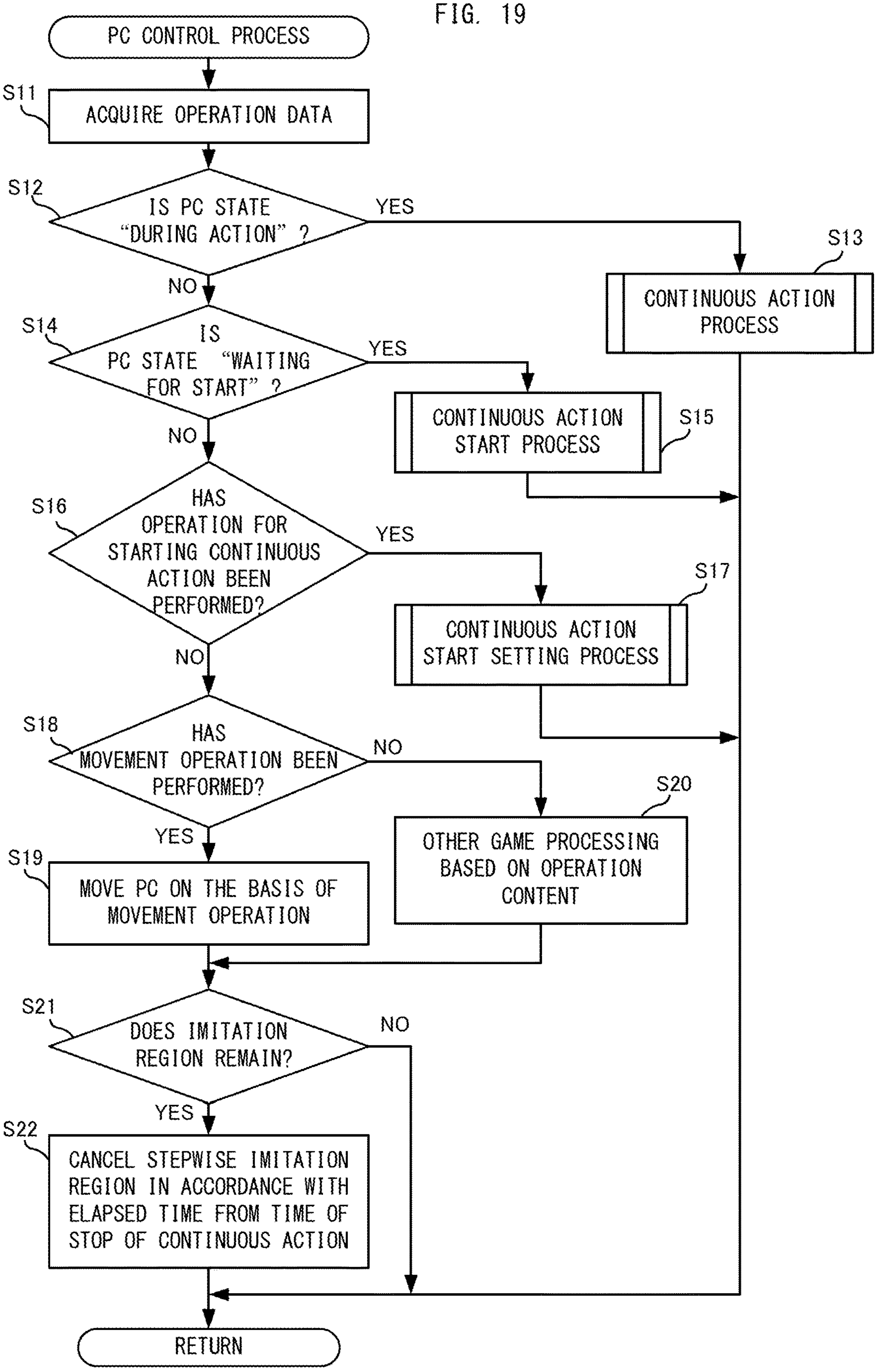
FIG. 19 is a non-limiting example flowchart showing the details of a PC control process.

Next, in step S2, the processor 81 executes a PC control process. FIG. 19 is a flowchart showing the details of the PC control process. First, in step S11, the processor 81 acquires the operation data 309. Next, in step S12, the processor 81 determines whether the PC state data 353 is "during action" (in the PC state data 353, the "non-action state" is set as a default state). As a result of the determination, if the PC state data 353 is not "during action" (NO in step S12), in step S14, the processor 81 determines whether the PC state data 353 is "waiting for start". As a result of the determination, if the PC state data 353 is also not "waiting for start" (NO in step S14), in step S16, the processor 81 determines whether an input to the cross key has been made, that is, an operation for starting a continuous action has been performed.

Figure 20:
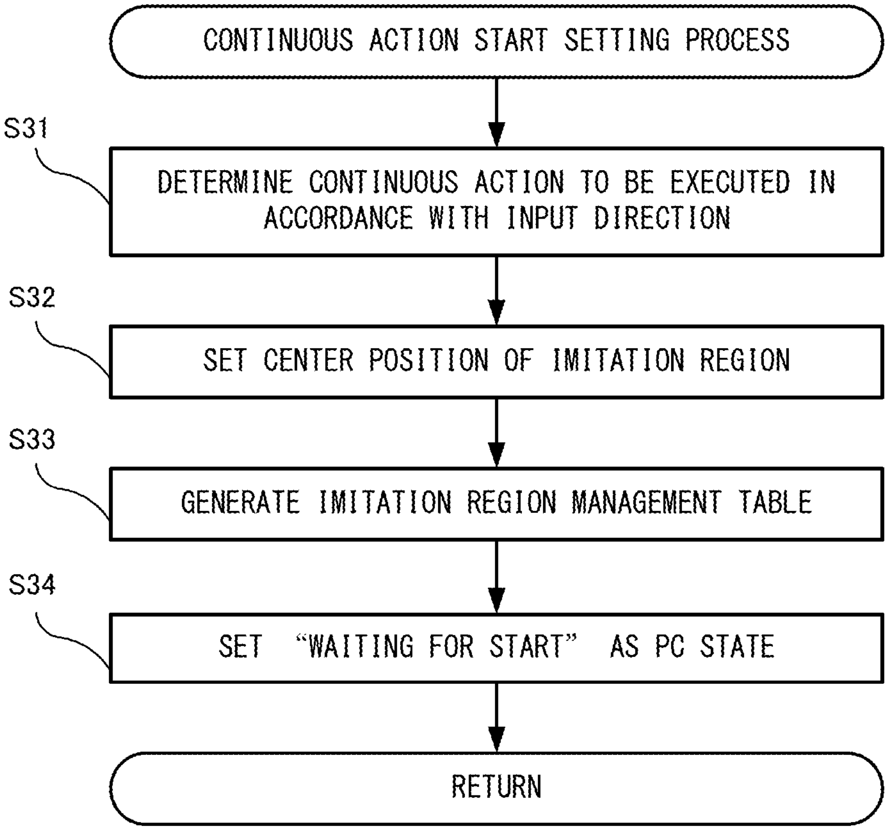
FIG. 20 is a non-limiting example flowchart showing the details of a continuous action start setting process.

As a result of the determination, if an operation for starting a continuous action has been performed (YES in step S16), in step S17 the processor 81 executes a continuous action start setting process. FIG. 20 is a flowchart showing the details of the continuous action start setting process. In FIG. 20, first, in step S21, the processor 81 refers to the continuous action master 304 and determines a continuous action to be executed, in accordance with the input direction to the cross key. Then, the processor 81 sets the action ID 341 of the determined continuous action as the PC execution action ID 354.

Next, in step S32, the processor 81 sets the current position of the PC 201 at that time as the center position of the imitation region. Next, in step S33, the processor 81 generates the imitation region management data 307. Specifically, the processor 81 calculates the number of stages at which the imitation region is expanded, on the basis of the direct distance from the center position to the edge of the dance area. Furthermore, the processor 81 generates the imitation region management data 307 in accordance with this number of stages. At this time, the processor 81 sets the valid/invalid flag 373 to "invalid". Moreover, the processor 81 defines the content of the range definition data 372 such that the imitation region expands in units of 2 m from a lower stage.

Next, in step S34, the processor 81 sets "waiting for start" in the PC state data 353. Then, the processor 81 ends the continuous action start setting process.

Referring back to FIG. 19, when the continuous action start setting process ends, the PC control process ends.

Figure 21:
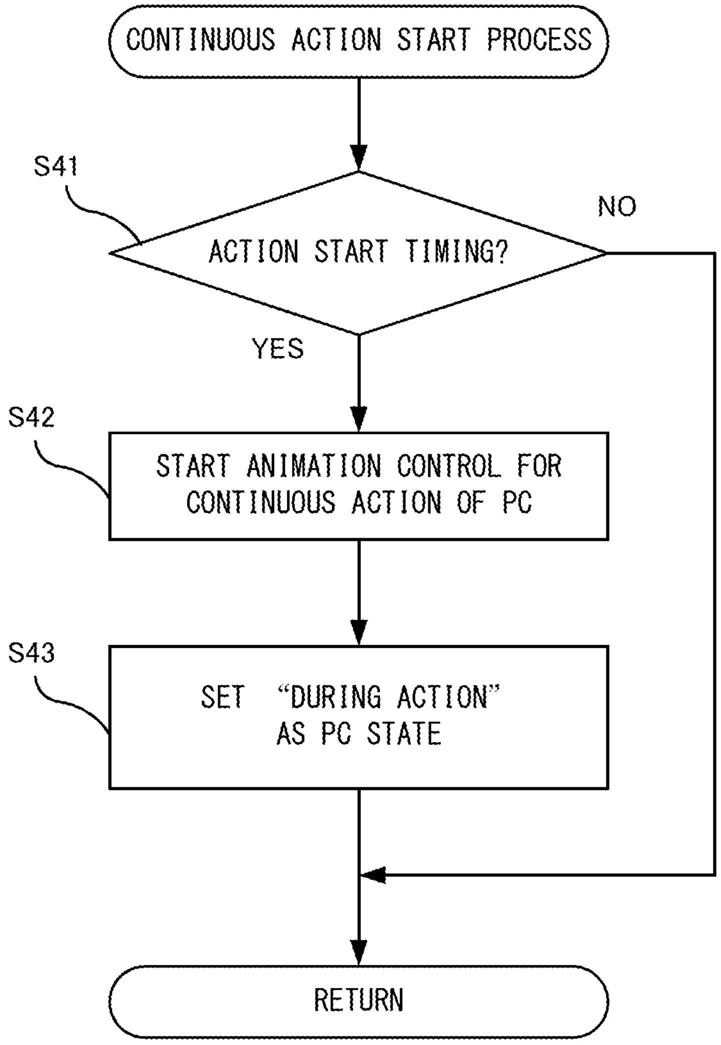
FIG. 21 is a non-limiting example flowchart showing the details of a continuous action start process.

Next, processing in the case where, as a result of the above determination in step S14, it is determined that the PC state data 353 is "waiting for start" (YES in step S14), will be described. In this case, in step S15, the processor 81 executes a continuous action start process. In this process, the processor 81 executes a process of causing the PC 201 to start the continuous action after the PC 201 waits for the arrival of the BGM action start timing. FIG. 21 is a flowchart showing the details of the continuous action start process. In FIG. 21, first, in step S41, the processor 81 determines whether the action start timing has arrived, on the basis of the BGM data 308. As a result of the determination, if the action start timing has not arrived (NO in step S41), the processor 81 ends the continuous action start process. On the other hand, if the action start timing has arrived (YES in step S41), in step S42, the processor 81 starts animation control for the continuous action. In addition, at the same time, the processor 81 starts counting an elapsed time from the start of the continuous action. Subsequently, in step S43, the processor 81 sets "during action" in the PC state data 353. Thereafter, the processor 81 ends the continuous action start process.

Referring back to FIG. 19, when the continuous action start process ends, the PC control process ends.

Figure 22:
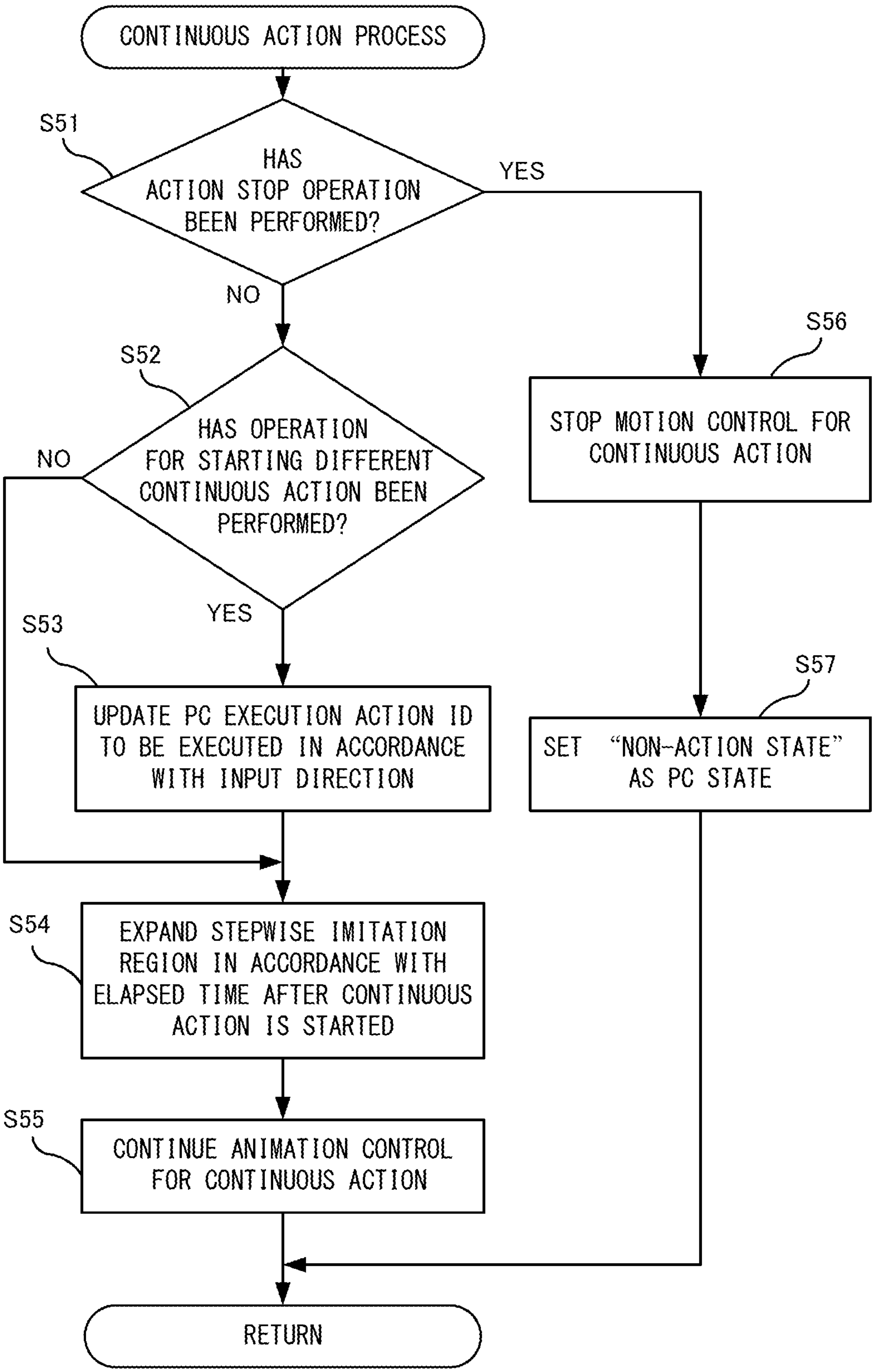
FIG. 22 is a non-limiting example flowchart showing the details of a continuous action process.

Next, processing in the case where, as a result of the above determination in step S12, the PC state data 353 is "during action" (YES in step S12), will be described. In this case, in step S13, the processor 81 executes a continuous action process. FIG. 22 is a flowchart showing the details of the continuous action process. In FIG. 22, first, in step S51, the processor 81 determines whether the above-described action stop operation has been performed. As a result of the determination, if the action stop operation has not been performed (NO in step S51), in step S52, the processor 81 determines whether an operation for starting a different continuous action has been performed through an operation on the cross key. For example, this is the case where the rightward direction portion of the cross key is pressed while the continuous action corresponding to the upward direction is being executed. As a result of the determination, if an operation for starting a different continuous action has been performed (YES in step S52), the processor 81 updates the content of the PC execution action ID 354 with the action ID 341 related to the continuous action corresponding to the input direction. On the other hand, if an operation for starting a different continuous action has not been performed (NO in step S52), the process in step S53 is skipped, and the processor 81 advances the processing to the next step.

Next, in step S54, the processor 81 executes a process for expanding the imitation region in accordance with the elapsed time from the start of the continuous action. That is, the processor 81 sets the valid/invalid flag 373 of the imitation region management data 307 to "valid" in order from a lower stage number every 4 seconds after the continuous action is started. In the example of FIG. 17, the valid/invalid flag 373 for which the stage number 371 is "1" is set to "valid" at the time at which 4 seconds elapses from the start of the continuous action. Furthermore, the valid/invalid flag 373 for which the stage number 371 is "2" is set to "valid" at the time at which 8 seconds elapses from the start of the continuous action. Moreover, the valid/invalid flag 373 for which the stage number 371 is "3" is set to "valid" at the time at which 12 seconds elapses from the start of the continuous action.

Next, in step S55, the processor 81 continues to execute the animation control for the continuous action designated by the PC execution action ID 354. Thereafter, the processor 81 ends the continuous action process. If a different continuous action is designated while a certain continuous action is being executed, control in which the animation of the continuous action to be executed is switched at the timing at which the action start timing arrives as described above is performed.

Next, processing in the case where, as a result of the above determination in step S51, the action stop operation has been performed (YES in step S51), will be described. In this case, in step S56, the processor 81 stops the animation control for the continuous action of the PC 201 executed at that time. In addition, at the same time, the processor 81 stops the counting of the elapsed time which is performed from the start of the continuous action, and further starts counting an elapsed time from the time at which the action stop operation is performed. Next, in step S57, the processor 81 sets "non-action state" in the PC state data 353. Thereafter, the processor 81 ends the continuous action process.

Referring back to FIG. 19, when the continuous action process ends, the processor 81 ends the PC control process.

Next, processing in the case where, as a result of the above determination in step S16, an operation for starting a continuous action has not been performed (NO in step S16), will be described. In this case, in step S18, the processor 81 determines whether a movement operation has been performed. As a result of the determination, if a movement operation has been performed (YES in step S18), in step S19, the processor 81 updates the content of the current position data 352 on the basis of the content of the movement operation. Then, the processor 81 moves the PC 201 to the updated position.

On the other hand, as a result of the determination in step S18, if a movement operation has not been performed (NO in step S18), in step S20, the processor 81 executes game processing other than the above as appropriate on the basis of the operation content (for example, virtual camera operation, a process of taking a screen shot, etc.).

Next, in step S21, the processor 81 refers to the imitation region management data 307 and determines whether the imitation region still remains. For example, the processor 81 determines whether there is any imitation region for which the valid/invalid flag 373 is "valid". As a result of the determination, if the imitation region remains (YES in step S21), the current situation is considered as a situation in which the imitation region remains when the PC 201 is in the "non-action state", and as a situation in which the action stop operation has just been performed. In this case, in step S22, the processor 81 executes a process of stepwise cancelling the imitation region in accordance with the elapsed time from the time at which the action stop operation is performed. Specifically, the processor 81 sets the valid/invalid flag 373 to "invalid" in order from a region at a stage closer to the central point of the imitation region every 4 seconds from the time at which the action stop operation is performed. Furthermore, if the regions at all the stages in the imitation region management data 307 become "invalid", the processor 81 deletes the imitation region management data 307. Thereafter, the processor 81 ends the PC control process.

On the other hand, as a result of the above determination in step S21, if no imitation region remains, for example, if there is no imitation region management data 307 (NO in step S21, the above process in step S22 is skipped, and the processor 81 ends the PC control process.

[Control of NPCs]

Figure 23:
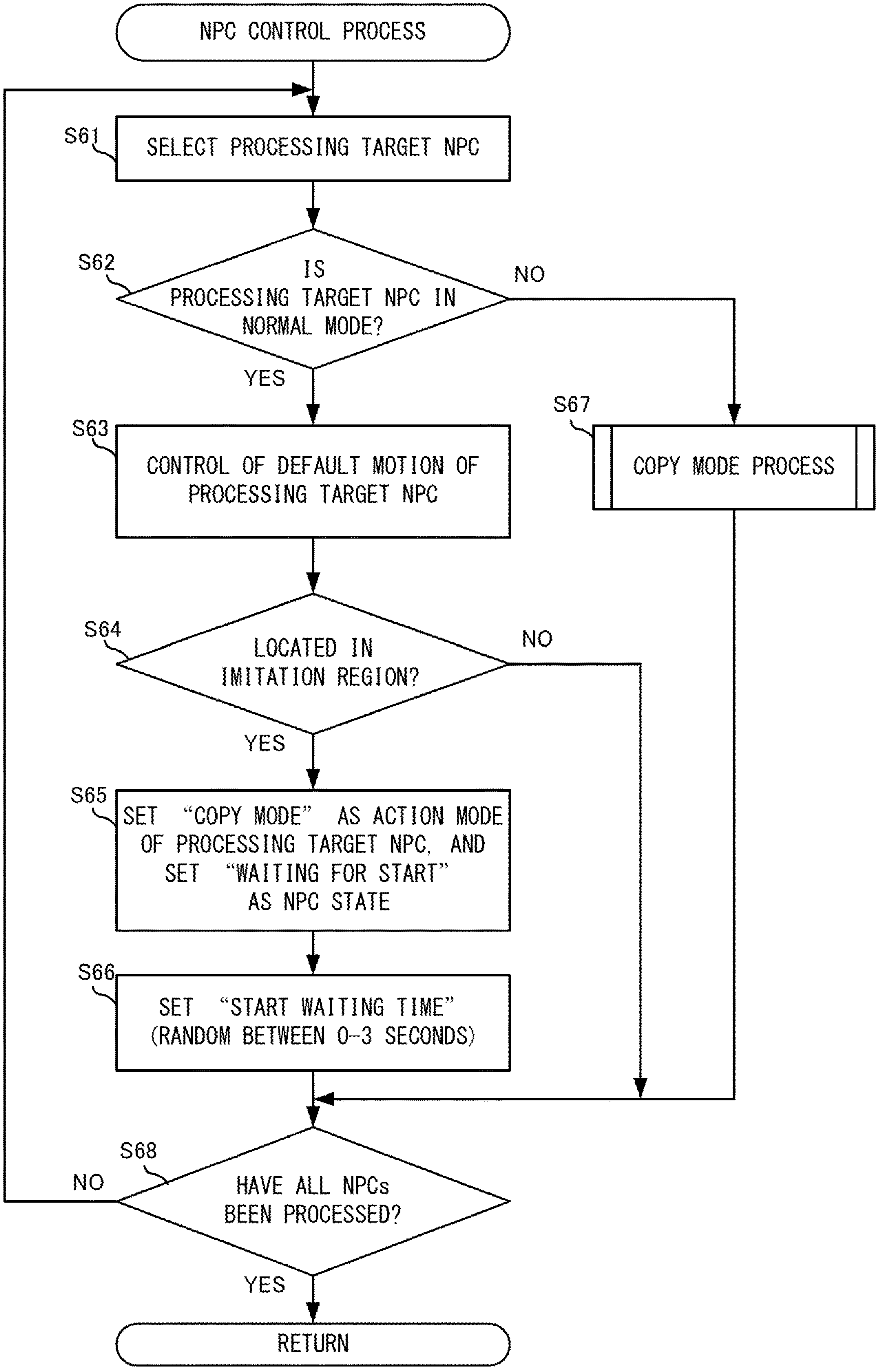
FIG. 23 is a non-limiting example flowchart showing the details of a NPC control process.

Referring back to FIG. 18, next to the PC control process, in step S3, the processor 81 executes a NPC control process. In this process, control in which the action mode of the NPC is switched as appropriate on the basis of the positional relationship with the imitation region, etc., are performed. FIG. 23 is a flowchart showing the details of the NPC control process. In FIG. 23, first, in step S61, the processor 81 selects one NPC to be subjected to processing described below (hereinafter, referred to as a processing target NPC) from a plurality of NPCs existing in the dance area (the selection method may be any method).

Next, in step S62, the processor 81 determines whether the action mode of the processing target NPC is the normal mode, on the basis of the NPC data 306. As a result of the determination, if the action mode of the processing target NPC is the normal mode (YES in step S62), in step S63, the processor 81 performs AI control for the processing target NPC. In the AI control, control in which the processing target NPC makes a motion based on the default animation data 364 is performed.

Next, in step S64, the processor 81 determines whether the processing target NPC is located in the imitation region. In other words, the processor 81 determines whether the position of the processing target NPC is included in the valid imitation region. As a result of the determination, if the processing target NPC is located in the imitation region (YES in step S64), in step S65, the processor 81 sets "copy mode" as the action mode 362 of the processing target NPC. Furthermore, the processor 81 sets "waiting for start" as the NPC state 363 of the processing target NPC.

Next, in step S66, the processor 81 randomly determines the start waiting time 366 for the processing target NPC between 0 seconds and 3 seconds. Furthermore, the processor 81 also starts counting an elapsed time for the start waiting time 366. Thereafter, the processor 81 advances the processing to step S68 described later.

On the other hand, as a result of the above determination in step S64, if the processing target NPC is not located in the imitation region (NO in step S64), the above processes in steps S65 and S66 are skipped.

Figure 24:
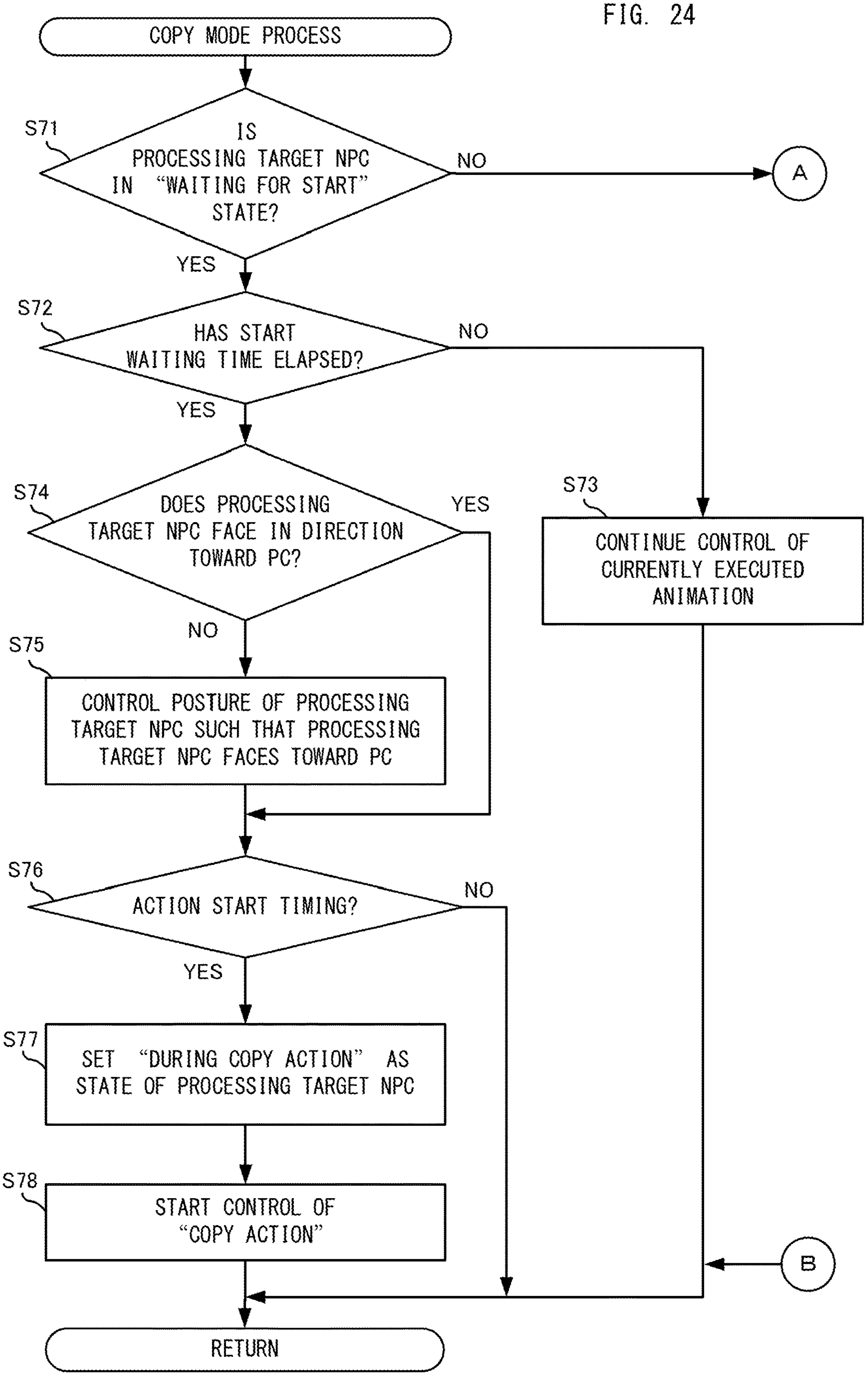
FIG. 24 is a non-limiting example flowchart showing the details of a copy mode process.
Figure 25:
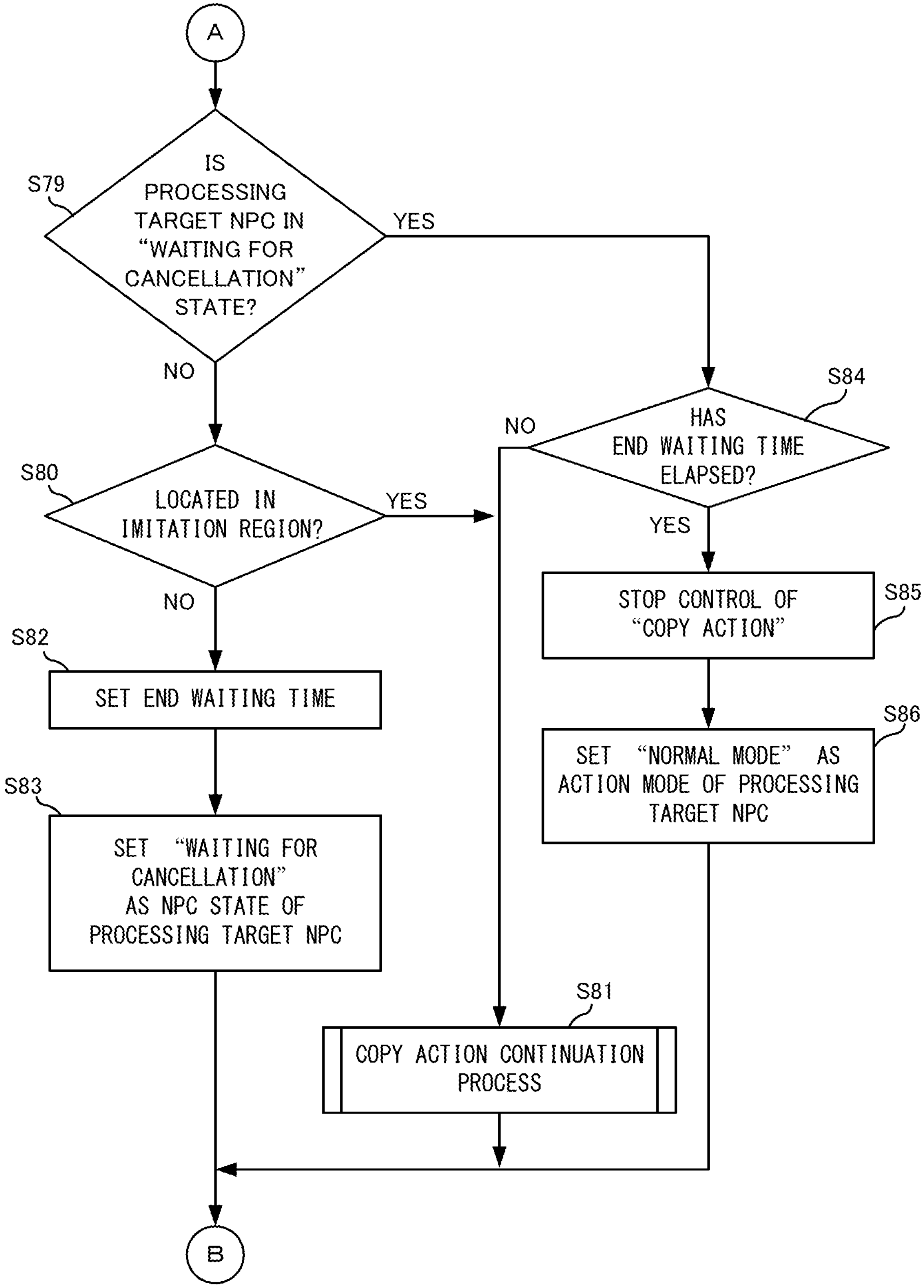
FIG. 25 is a non-limiting example flowchart showing the details of the copy mode process.

Next, processing in the case where, as a result of the above determination in step S62, the action mode 362 of the processing target NPC is not the normal mode (NO in step S62), will be described. In this case, since the action mode of the processing target NPC is the copy mode, the processor 81 executes a copy mode process in step S67. FIG. 24 and FIG. 25 are flowcharts showing the details of the copy mode process. In FIG. 24, first, in step S71, the processor 81 determines whether the NPC state 363 of the processing target NPC is "waiting for start". As a result of the determination, if the NPC state 363 of the processing target NPC is "waiting for start" (YES in step S71), in step S72, the processor 81 refers to the start waiting time 366 of the processing target NPC and determines whether this start waiting time 366 has elapsed from the time at which the processing target NPC comes to the state of "waiting for start". As a result of the determination, if the start waiting time 366 has not elapsed yet (NO in step S72), in step S73, the processor 81 continues the control of the currently executed animation. Thereafter, the processor 81 ends the copy mode process. In the process in step S73, the continuously controlled animation can be either a default animation or the above continuous action animation. The former is the case immediately after the action mode of the NPC is switched from the normal mode to the copy mode, and the default animation by AI control is continued until the start waiting time 366 elapses. The latter is the case where the continuous action performed by the PC 201 is changed to a different continuous action while the continuous action of the PC 201 is being imitated. In this case, the continuous action before the change is continued until the start waiting time 366 elapses, and when the start waiting time 366 elapses, the continuous action after the change is imitated.

On the other hand, as a result of the determination in step S72, if the start waiting time 366 has elapsed (YES in step S72), control for causing the NPC to face toward the PC 201 is performed. In this case, in step S74, the processor 81 determines whether the processing target NPC faces the direction in which the PC 201 is located. In addition, accordingly, the processor 81 stops the counting of the elapsed time for the start waiting time 366. As a result of the determination, if the processing target NPC does not face the direction in which the PC 201 is located (NO in step S74), in step S75, the processor 81 changes the posture of the processing target NPC such that the processing target NPC faces toward the PC 201. Thereafter, the processor 81 advances the processing to step S76.

On the other hand, as a result of the determination in step S74, if the processing target NPC faces the direction in which the PC 201 is located (YES in step S74), the posture of the processing target NPC does not have to be changed, so that the above process in step S75 is skipped and the processor 81 advances the processing to the next step.

Next, in step S76, the processor 81 refers to the BGM data 308 and determines whether the action start timing has arrived. As a result of the determination, if the action start timing has arrived (YES in step S76), in step S77, the processor 81 sets "during copy action" as the NPC state 363 of the processing target NPC. Subsequently, in step S78, the processor 81 starts action control by the copy action for the processing target NPC. Specifically, first, the processor 81 sets the content of the PC execution action ID 354 at this time as the NPC execution action ID 365. Then, the processor 81 refers to the continuous action master 304 and starts action control of the NPC based on the animation definition data 342 of the continuous action corresponding to the NPC execution action ID 365. Thereafter, the processor 81 ends the copy mode process.

On the other hand, as a result of the above determination in step S76, if the action start timing has not arrived (NO in step S76), the processor 81 skips the above processes in steps S77 and S78 and ends the copy mode process. That is, even after the NPC faces toward the PC 201, the copy action is not started and the NPC waits until the action start timing arrives. Therefore, for example, even if the timings at which a plurality of NPCs face toward the PC 201 are different from each other, the timings at which the NPCs actually start the copy action may be the same.

Next, processing in the case where, as a result of the above determination in step S71, the NPC state 363 of the processing target NPC is not "waiting for start" (NO in step S71), will be described. In this case, in step S79 in FIG. 25, the processor 81 determines whether the NPC state 363 of the processing target NPC is "waiting for cancellation". As a result of the determination, if the NPC state 363 of the processing target NPC is not "waiting for cancellation" (NO in step S79), the processing target NPC is considered to be in the state of "during copy action". In this case, in step S80, the processor 81 determines whether the processing target NPC is located in the imitation region. As a result of the determination, if the processing target NPC is located in the imitation region (YES in step S80), the current state is considered as a state where cancellation of the imitation region has not been performed yet. In this case, in step S81, the processor 81 executes a copy action continuation process.

Figure 26:
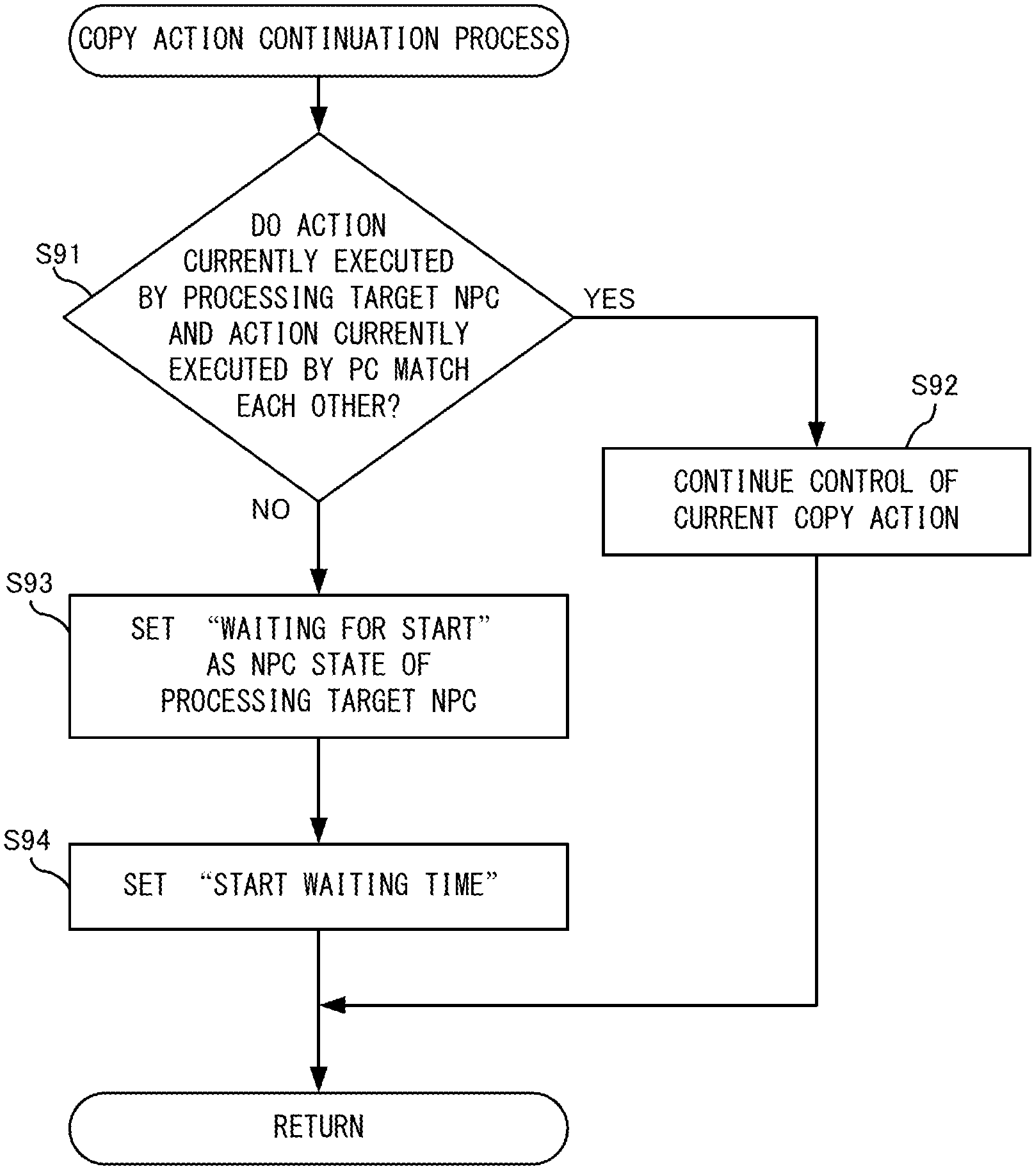
FIG. 26 is a non-limiting example flowchart showing the details of a copy action continuation process.

FIG. 26 is a flowchart showing the details of the copy action continuation process. First, in step S91, the processor 81 determines whether the continuous action currently imitated by the processing target NPC matches the continuous action currently executed by the PC 201. This determination is performed on the basis of whether the PC execution action ID 354 and the NPC execution action ID 365 match each other. As a result of the determination, if the PC execution action ID 354 and the NPC execution action ID 365 match each other (YES in step S91), in step S92, the processor 81 continues the control of the current copy action. Then, the processor 81 ends the copy action continuation process. On the other hand, if the PC execution action ID 354 and the NPC execution action ID 365 do not match each other (NO in step S91), the current situation is considered as a situation in which the PC 201 has changed the continuous action to be executed to a different continuous action (without performing the action stop operation). In this case, the processor 81 performs a process for causing the processing target NPC to imitate the changed continuous action after the waiting time randomly determined between 0 and 3 seconds elapses. That is, in step S93, the processor 81 sets "waiting for start" as the NPC state 363 of the processing target NPC. Subsequently, in step S94, the processor 81 randomly determines the start waiting time 366 for the processing target NPC between 0 seconds and 3 seconds. Furthermore, the processor 81 also starts counting an elapsed time for the start waiting time 366. Thereafter, the processor 81 ends the copy action continuation process. Accordingly, as a result of the above processes in steps S72 to S78, after the start waiting time 366 set here elapses, the copy action in which the changed continuous action is imitated is started.

Referring back to FIG. 25, next, processing in the case where, as a result of the above determination in step S80, the processing target NPC is not located in the imitation region (NO in step S80), will be described. This situation is considered as a situation in which the imitation region in which the processing target NPC has been located is cancelled. In this case, in step S82, the processor 81 randomly determines the end waiting time 367 for the processing target NPC between 0 seconds and 3 seconds. Next, in step S83, the processor 81 sets "waiting for cancellation" as the NPC state 363 of the processing target NPC. In addition, the processor 81 also starts counting an elapsed time for the end waiting time 367. Thereafter, the processor 81 ends the copy mode process.

Next, processing in the case where, as a result of the above determination in step S79, the NPC state 363 of the processing target NPC is "waiting for cancellation" (YES in step S79), will be described. In this case, in step S84, the processor 81 determines whether the end waiting time 367 has elapsed from the time at which the processing target NPC comes to the state of "waiting for cancellation". As a result of the determination, if the end waiting time 367 has not elapsed yet (NO in step S84), the processor 81 executes the above process in step S81. That is, a process of continuing the copy action control at that time until the end waiting time 367 elapses is performed. On the other hand, if the end waiting time 367 has elapsed (YES in step S84), in step S85, the processor 81 stops the counting of the elapsed time for the end waiting time 367. Then, the processor 81 stops the control for the copy action of the processing target NPC. Next, in step S86, the processor 81 sets "normal mode" as the action mode 362 of the processing target NPC. Thereafter, the processor 81 ends the copy mode process.

Referring back to FIG. 23, next, in step S68, the processor 81 determines whether the above processes in steps S61 to S67 have been performed on all the NPCs in the dance area. As a result of the determination, if any unprocessed NPC remains (NO in step S68), the processor 81 returns to step S61, selects the next processing target NPC, and repeats the above processes. If all the NPCs have been processed (YES in step S68), the processor 81 ends the NPC control process.

[Rendering Process]

Referring back to FIG. 18, next to the NPC control process, in step S4, the processor 81 executes a rendering process. That is, the processor 81 executes a process of capturing the virtual space in which the above-described processes are reflected, with the virtual camera to generate a game image, and outputting the game image to the display unit 5.

Next, in step S5, the processor 81 determines whether an end condition for the dance area processing has been satisfied. For example, the end condition is a condition that the PC 201 exits from the dance area. If the end condition has not been satisfied (NO in step S5), the processor 81 returns to step S1 and repeats the process. If the end condition has been satisfied (YES in step S5), the processor 81 ends the dance area processing.

This is the end of the detailed description of the dance area processing according to the exemplary embodiment.

As described above, in the exemplary embodiment, a plurality of NPCs are caused to perform the same action as the continuous action performed by the PC 201. At this time, control is performed such that the NPC closer to the PC 201 starts the action first and the NPC farther from the PC 201 starts the action later. That is, control of expanding the range of the above-described imitation region in accordance with the passage of time, is performed. Therefore, the NPCs can be caused to perform a motion in which the action performed by the PC 201 gradually propagates to the NPCs around the PC 201. Accordingly, it is possible to cause the plurality of NPCs to perform a motion that gives less uncomfortable feeling, when causing the NPCs to perform a motion that imitates the action of the PC 201.

Modifications

In the above embodiment, the example in which, after the NPC becomes located in the imitation region, a random waiting time is further provided and then the NPC is caused to start the copy action, has been described. In another exemplary embodiment, control may be performed such that the NPC is caused to start the copy action as soon as the NPC becomes located in the imitation region without providing such a waiting time. In this case, the NPCs that have performed different motions start the copy action at the same time at a certain timing. For example, as one representation of a dance event by a plurality of characters, in the case of intentionally causing the characters to start the copy action at the same time, it is possible to use such control.

In the above embodiment, when the PC 201 is in the state of "during action", by operating the cross key, the continuous action can be changed in the middle of the continuous action without performing the action stop operation. Then, at this time, the NPC is controlled so as to imitate the changed continuous action after a waiting time randomly determined between 0 and 3 seconds. That is, control of gradually expanding the imitation region in relation to the changed continuous action is not performed. In this regard, in another exemplary embodiment, when the continuous action is changed without performing the action stop operation, control of gradually expanding the imitation region associated with the changed action may be performed. For example, similar to the above, control of expanding the imitation region associated with the changed action by 2 m every 4 seconds, may be performed. In this case, for example, the above-described imitation region management data 307 may be prepared for each continuous action for which a start operation/change operation is performed.

The above embodiment has been described assuming that each NPC in the dance area does not move from the placed position. In another exemplary embodiment, for example, the NPC may be movable by the PC 201 pushing the NPC. In this case, regarding the timing at which the NPC starts the above copy action, control of moving the NPC to the original placed position and then causing the NPC to start the copy action may be performed. Moreover, when the PC 201 is located at the original placed position, control of causing the NPC to start the copy action at a position adjacent to the original placed position may be performed.

In the above embodiment, the case where the series of processes according to the dance area processing are performed in the single game apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the game apparatus 2 may be configured to send operation data indicating a user's operation to a predetermined server, and the server may be configured to execute various kinds of game processing and stream the execution results as video/audio to the game apparatus 2.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A computer-readable non-transitory storage medium having stored therein a game program comprising instructions that are configured to cause a computer of an information processing apparatus to perform operations comprising:

locating a player character and a plurality of non-player characters within a virtual space;

displaying images that are generated based on using a virtual camera of the virtual space;

causing the player character to start a continuous action in the virtual space on the basis of an operation input;

repeatedly, every time a predetermined time elapses from the start of the continuous action performed by the player character, controlling a non-player character interaction range to expand based on an amount of time that has elapsed from the start of the continuous action performed by the player character, wherein the non-player character interaction range is based on a position of the player character;

determining whether a non-player character of the plurality of non-player characters is included in the non-player character interaction range;

based on the non-player character determined to be included in the non-player character interaction range, causing the non-player character to start the continuous action; and controlling the virtual camera to include the player character during repeated expansion of the non-player character interaction range, wherein the images that are generated and displayed are based on how the virtual camera is controlled.

2. The storage medium according to claim 1, wherein the operations further comprise changing a direction of the non-player character included in the non-player character interaction range such that the non-player character faces toward the player character; and then cause the non-player character to start the continuous action.

3. The storage medium according to claim 2, operations further comprise:

outputting BGM in which a plurality of action start timings are set in accordance with passage of a reproduction time;

when causing the player character to start the continuous action on the basis of the operation input, causing the player character to start the continuous action when the action start timing arrives after the operation input; and causing the non-player character included in the non-player character interaction range to start the continuous action when the action start timing arrives after a waiting time set for each non-player character further elapses from the elapsed time from the action start.

4. The storage medium according to claim 3, wherein the operations further comprise:

causing the player character or the non-player character to perform the continuous action by causing the player character or the non-player character to repeat an animation to be reproduced in a predetermined unit period, and the plurality of action start timings are set at an interval that is an integral multiple of the unit period.

5. The storage medium according to claim 1, wherein the operations further comprise: causing the non-player character included in the non-player character interaction range to start the continuous action after, in addition to an elapsed time from the action start until the non-player character is included in the non-player character interaction range, a waiting time set for each non-player character further elapses.

6. The storage medium according to claim 5, wherein the operations further comprise: causing the non-player character included in the non-player character interaction range to start the continuous action after, in addition to the elapsed time, a waiting time randomly set for each non-player character further elapses.

7. The storage medium according to claim 5, wherein the operations further comprise: changing the direction of the non-player character included in the non-player character interaction range such that the non-player character faces toward the player character, at a timing at which, in addition to the elapsed time from the action start until the non-player character is included in the non-player character interaction range, a waiting time set for each non-player character further elapses.

8. The storage medium according to claim 1, operations further comprise: causing the player character or the non-player character to perform the continuous action by causing the player character or the non-player character to repeat an animation to be reproduced in a predetermined unit period.

9. The storage medium according to claim 1, wherein the operations further comprise: setting the non-player character interaction range such that the non-player character interaction range expands stepwise with the position of the player character as a center in accordance with the elapsed time from the action start.

10. A game system comprising a game apparatus including a processor, the processor being configured to perform operations comprising:

locating a player character and a plurality of non-player characters within a virtual space;

displaying images that are generated based on using a virtual camera of the virtual space;

causing the player character to start a continuous action in the virtual space on the basis of an operation input;

repeatedly, every time a predetermined time elapses from the start of the continuous action performed by the player character, controlling a non-player character interaction range to expand based on an amount of time that has elapsed from the start of the continuous action performed by the player character, wherein the non-player character interaction range is based on a position of the player character; determining whether a non-player character of the plurality of non-player characters is included in the non-player character interaction range;

based on the non-player character determined to be included in the non-player character interaction range, causing the non-player character to start the continuous action; and controlling the virtual camera to include the player character during repeated expansion of the non-player character interaction range, wherein the images that are generated and displayed are based on how the virtual camera is controlled.

11. The game system according to claim 10, wherein the operations further comprise: changing a direction of the non-player character included in the non-player character interaction range such that the non-player character faces toward the player character; and then cause the non-player character to start the continuous action.

12. The game system according to claim 11, wherein the operations further comprise:

outputting BGM in which a plurality of action start timings are set in accordance with passage of a reproduction time;

when causing the player character to start the continuous action on the basis of the operation input, causing the player character to start the continuous action when the action start timing arrives after the operation input; and causing the non-player character included in the non-player character interaction range to start the continuous action when the action start timing arrives after a waiting time set for each non-player character further elapses from the elapsed time from the action start.

13. The game system according to claim 12, wherein operations further comprise:

causing the player character or the non-player character to perform the continuous action by causing the player character or the non-player character to repeat an animation to be reproduced in a predetermined unit period, and the plurality of action start timings are set at an interval that is an integral multiple of the unit period.

14. The game system according to claim 10, wherein the operations further comprise causing the non-player character included in the non-player character interaction range to start the continuous action after, in addition to an elapsed time from the action start until the non-player character is included in the non-player character interaction range, a waiting time set for each non-player character further elapses.

15. The game system according to claim 14, wherein the operations further comprise causing the non-player character included in the non-player character interaction range to start the continuous action after, in addition to the elapsed time, a waiting time randomly set for each non-player character further elapses.

16. The game system according to claim 14, wherein the operations further comprise changing the direction of the non-player character included in the non-player character interaction range such that the non-player character faces toward the player character, at a timing at which, in addition to the elapsed time from the action start until the non-player character is included in the non-player character interaction range, a waiting time set for each non-player character further elapses.

17. The game system according to claim 10, wherein the operations further comprise causing the player character or the non-player character to perform the continuous action by causing the player character or the non-player character to repeat an animation to be reproduced in a predetermined unit period.

18. The game system according to claim 10, wherein the operations further comprise setting the non-player character interaction range such that the non-player character interaction range expands stepwise with the position of the player character as a center in accordance with the elapsed time from the action start.

19. A game apparatus comprising a processor, the processor being configured to perform operations comprising:

locating a player character and a plurality of non-player characters within a virtual space;

displaying images that are generated based on using a virtual camera of the virtual space;

causing the player character to start a continuous action in the virtual space on the basis of an operation input;

repeatedly, every time a predetermined time elapses from the start of the continuous action performed by the player character, controlling a non-player character interaction range to expand based on an amount of time that has elapsed from the start of the continuous action performed by the player character, wherein the non-player character interaction range is based on a position of the player character; determining whether a non-player character of the plurality of non-player characters is included in the non-player character interaction range;

based on the non-player character determined to be included in the non-player character interaction range, causing the non-player character to start the continuous action; and controlling the virtual camera to include the player character during repeated expansion of the non-player character interaction range, wherein the images that are generated and displayed are based on how the virtual camera is controlled.

20. A game processing method executed by a computer of an information processing apparatus, the game processing method comprising:

locating a player character and a plurality of non-player characters within a virtual space;

displaying images that are generated based on using a virtual camera of the virtual space;

causing the player character to start a continuous action in the virtual space on the basis of an operation input;

repeatedly, every time a predetermined time elapses from the start of the continuous action performed by the player character, controlling a non-player character interaction range to expand based on an amount of time that has elapsed from the start of the continuous action performed by the player character, wherein the non-player character interaction range is based on a position of the player character; determining whether a non-player character of the plurality of non-player characters is included in the non-player character interaction range;

based on the non-player character determined to be included in the non-player character interaction range, causing the non-player character to start the continuous action; and controlling the virtual camera to include the player character during repeated expansion of the non-player character interaction range, wherein the images that are generated and displayed are based on how the virtual camera is controlled.

* * * * *